US012342793B1

(12) United States Patent
Mullin et al.

(10) Patent No.: US 12,342,793 B1
(45) Date of Patent: Jul. 1, 2025

(54) SELF-RIGHTING STICK-TYPE OBJECT HOLDER FOR PETS

(71) Applicant: Make Ideas, LLC, La Jolla, CA (US)

(72) Inventors: Keith Mullin, La Jolla, CA (US); Christopher Taddei, Carlsbad, CA (US); Lindsay Tracy, St. Charles, IL (US)

(73) Assignee: Make Ideas, LLC, La Jolla, CA (US)

( * ) Notice: Subject to any disclaimer, the term of this patent is extended or adjusted under 35 U.S.C. 154(b) by 0 days.

(21) Appl. No.: 18/612,544

(22) Filed: Mar. 21, 2024

Related U.S. Application Data

(60) Provisional application No. 63/453,657, filed on Mar. 21, 2023.

(51) Int. Cl.
*A01K 15/02* (2006.01)

(52) U.S. Cl.
CPC .................................. *A01K 15/026* (2013.01)

(58) Field of Classification Search
CPC .. A01K 15/026; A01K 15/025; A01K 5/0114; A01K 15/02
See application file for complete search history.

(56) References Cited

U.S. PATENT DOCUMENTS

| 6,217,408 | B1 | 4/2001 | Willinger |
| 8,225,747 | B2 | 7/2012 | Markham et al. |
| 8,640,647 | B2 | 2/2014 | Dotterer |
| 9,596,829 | B2 | 3/2017 | Wolfe, Jr. et al. |
| 10,582,696 | B1 | 3/2020 | Mullin |
| D884,288 | S | 5/2020 | O'Donnell et al. |
| 10,959,407 | B2 | 3/2021 | Christensen |
| 11,116,180 | B2 * | 9/2021 | Toolan ................. A01K 15/026 |
| 11,464,208 | B2 * | 10/2022 | Weller ................. A01K 15/026 |
| 2007/0044730 | A1 * | 3/2007 | Axelrod ............... A01K 15/026 |
| | | | 119/709 |
| 2008/0083378 | A1 | 4/2008 | Pearce |
| 2012/0318210 | A1 | 12/2012 | Anderson |
| 2015/0313184 | A1 * | 11/2015 | Woolwine ............ A01K 15/025 |
| | | | 119/51.01 |
| 2017/0055498 | A1 * | 3/2017 | McNulty .................. F16B 7/04 |

(Continued)

*Primary Examiner* — Trinh T Nguyen
(74) *Attorney, Agent, or Firm* — Tillman, Wright & Wolgin; James D. Wright; David R. Higgins

(57) ABSTRACT

A self-righting stick-type object holder for pets includes a set of fixed structure, that include a top shell and a bottom shell, ballast disposed in the bottom shell, and a collet disposed in the interior of the holder and having a plurality of collet jaws. The top and bottom shells are adjustably coupled to one another and define an interior of the holder. The bottom shell has an exterior having a spherical or semi-spherical profile to facilitate a smooth or relatively-smooth rolling function when the holder is placed upright on a flat surface. The fixed structures include tapered internal surfaces. The jaws have inward-facing contact surfaces that collectively define a central receptacle and outward-facing tapered surfaces that interact with the tapered internal surfaces. Adjusting the top and bottom shells forces the tapered internal surfaces against the outward-facing tapered surfaces of the collet jaws, thereby forcing the collet jaws together and reducing a diameter of the central receptacle such that a stick-type object may be retained therein. The ballast and bottom shell are adapted to return the holder to an upright position.

20 Claims, 25 Drawing Sheets

(56) References Cited

U.S. PATENT DOCUMENTS

| | | | |
|---|---|---|---|
| 2018/0325080 A1* | 11/2018 | Woolwine | A01K 15/025 |
| 2020/0154676 A1* | 5/2020 | Walt | A01K 15/026 |
| 2021/0204519 A1* | 7/2021 | Karras | A01K 15/026 |
| 2023/0232787 A1* | 7/2023 | Karras | A01K 15/026 119/709 |
| 2023/0263137 A1* | 8/2023 | Haarburger | A01K 5/0114 119/710 |

* cited by examiner

SELF-RIGHTING STICK-TYPE OBJECT HOLDER FOR PETS

CROSS-REFERENCE TO RELATED APPLICATION

The present application is a U.S. nonprovisional patent application of, and claims priority under 35 U.S.C. § 119(e) to, U.S. provisional patent application Ser. No. 63/453,657 filed Mar. 21, 2023, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to stick holders for pets, and, more specifically, to self-righting stick holders that easily adjust to retain stick holders of different types and sizes.

Background

It can be appreciated that treat dispensers, including wobbling treat dispensers or feeders have been in use for years. Typically, such inventions and prior art include treat dispensers that have ejection holes or trays that hold or contain kibble type dog treats or food. Other treat dispenses or feeders include designs where the treat has a receiving hole, where the treat is threaded onto a dispenser with a peg, or the like.

Unfortunately, existing designs of treat dispensers and feeders are not able to hold and grip stick-shaped treats and the like. Instead, pet owners, handlers, and the like (often referred to herein as "users") usually place stick-shaped treats directly in the mouths of dogs and other pets, or place them on the floor or ground where they rest motionless unless and until a pet interacts it, such as by picking it up in its jaws. Pets still enjoy the taste of the treats, or the physical sensation of chewing them, but the treats themselves are physically uninteresting, because they simply lay there. Pets sometimes learn the skill of holding stick-shaped treats upright between their paws, but devices that hold such treats are not common and are still static devices rather than providing further interaction with the pets.

In view of the foregoing disadvantages inherent in the known types of animal swaying or wobbling treat toys, needs exist for an animal treat toy capable of securely holding a stick shaped item while swaying, or in general being able to self-right itself as a pet interacts with the stick, and for an animal treat toy that may be easily manipulated by a user to install a stick-shaped treat therein.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of rigid pet toys, the present invention is not limited to use only in rigid pet toys, as will become apparent from the following summaries and detailed descriptions of aspects, features, and one or more embodiments of the present invention.

Broadly defined, the present invention according to one aspect relates to a self-righting stick-type object holder for pets, including: a set of fixed structures, including a top shell and a bottom shell, wherein (i) the top and bottom shells are adjustably coupled to one another and define an interior of the holder, (ii) the bottom shell has an exterior having a spherical or semi-spherical profile to facilitate a smooth or relatively-smooth rolling function when the holder is placed upright on a flat surface, (iii) one or more fixed structures, of the set of fixed structures, include tapered internal surfaces; ballast disposed in the bottom shell; and a collet disposed in the interior of the holder and having a plurality of collet jaws that have inward-facing contact surfaces, the inward-facing contact surfaces collectively defining a central receptacle, and outward-facing tapered surfaces, the outward-facing tapered surfaces arranged to interact with the tapered internal surfaces of the one or more fixed structures; wherein the top and bottom shells are adapted to be adjusted, relative to each other, to force the tapered internal surfaces against the outward-facing tapered surfaces of the collet jaws, thereby forcing the collet jaws together and reducing a diameter of the central receptacle such that a stick-type object may be clamped therein; and wherein the ballast and bottom shell are adapted to return the holder to an upright position such that the stick-type object is oriented generally vertically.

In a feature of this aspect, the top and bottom shells are adjustably coupled to one another via corresponding threads, and wherein the top and bottom shells are adapted to be adjusted, relative to each other, by screwing the top and bottom shells together via the threads.

In another feature of this aspect, the tapered internal surfaces are located primarily on an interior of the top shell.

In another feature of this aspect, adjacent jaws, of the plurality of collet jaws, are hinged together at lower portions thereof.

In a further feature, the adjacent jaws are hinged together via living hinges.

In another further feature, the adjacent jaws are hinged together from the central receptacle to outermost portions of the jaws.

In another further feature, each jaw has a jaw base including a radial side thereof, and wherein the adjacent jaws are hinged together for less than half of a length of the radial side of the jaw base.

In another further feature, the adjacent jaws are hinged together for less than one quarter of the length of the radial side of the jaw base.

In another further feature, the adjacent jaws are hinged together for about one sixth of the length of the radial side of the jaw base.

In another further feature, adjacent jaws, of the plurality of collet jaws, are completely disconnected from one another at lower portions thereof.

In another feature of this aspect, the jaws are biased to cause the jaws to spread open as the top and bottom shells are adjusted, relative to each other, by unscrewing the top and bottom shells from one another.

In a further feature, the bias is applied by hinges at bottoms of the jaws.

In another feature of this aspect, the set of fixed structures further includes a cinch ring, and the tapered internal surfaces are located primarily on an interior of the cinch ring.

In another feature of this aspect, the outward-facing tapered surfaces of the collet jaws and the tapered internal surfaces of the cinch ring are substantially conical in shape.

In another feature of this aspect, the cinch ring is supported by the bottom shell.

In another feature of this aspect, the ballast includes a solid weight.

In another feature of this aspect, the holder further includes a ballast cap that secures the ballast in place in the bottom shell.

In a further feature, the ballast is a fine granular material.

In another further feature, the ballast is a coarse granular material.

In another further feature, the ballast is a liquid.

In another feature of this aspect, the collet is supported by the ballast cap.

In another feature of this aspect, the inward-facing contact surfaces each include a plurality of teeth.

In another feature of this aspect, the collet is one of a plurality of collets of similar construction.

In another feature of this aspect, each collet jaw further includes an inward-facing undercut portion, beneath the inward-facing contact surface, adapted to receive a stop block on a lower end of the stick-type object such that the inward-facing contact surfaces clamp the stick-type object just above the stop block.

In a further feature, the inward-facing undercut portion has the shape of an angled portion of a cone.

In another further feature, a stick-type object is clamped between the jaws, the stop block is generally conical with a first conical angle relative to an axis of the stick-type object, the angled portion of the cone has a second conical angle relative to the axis of the stick-type object, and the first and second angles are generally similar.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
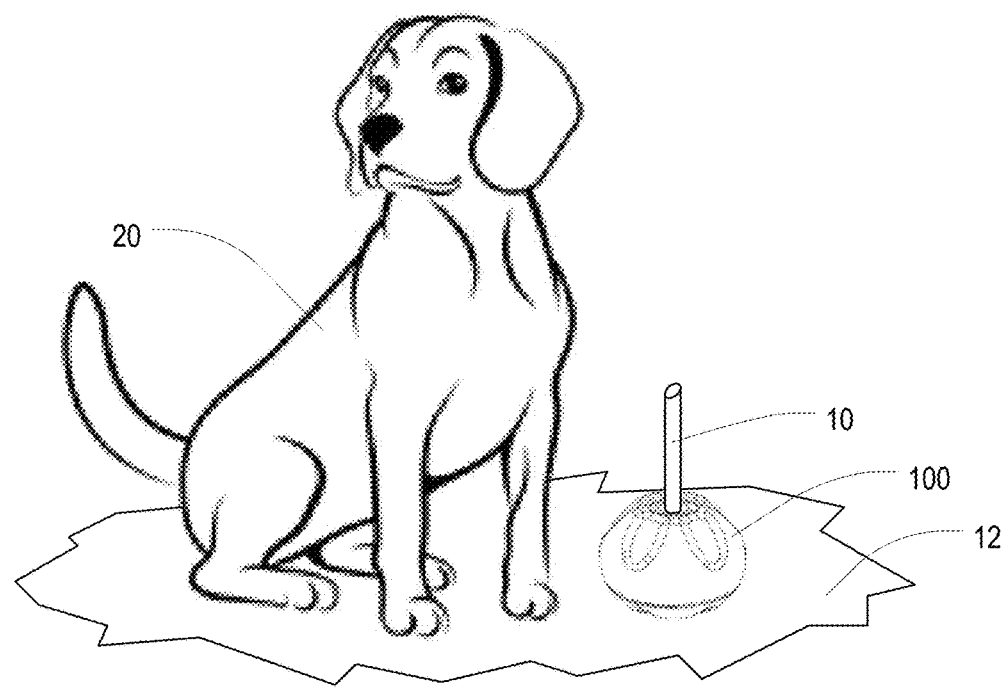
FIG. 1 is an illustration of a pet with a self-righting stick holder in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
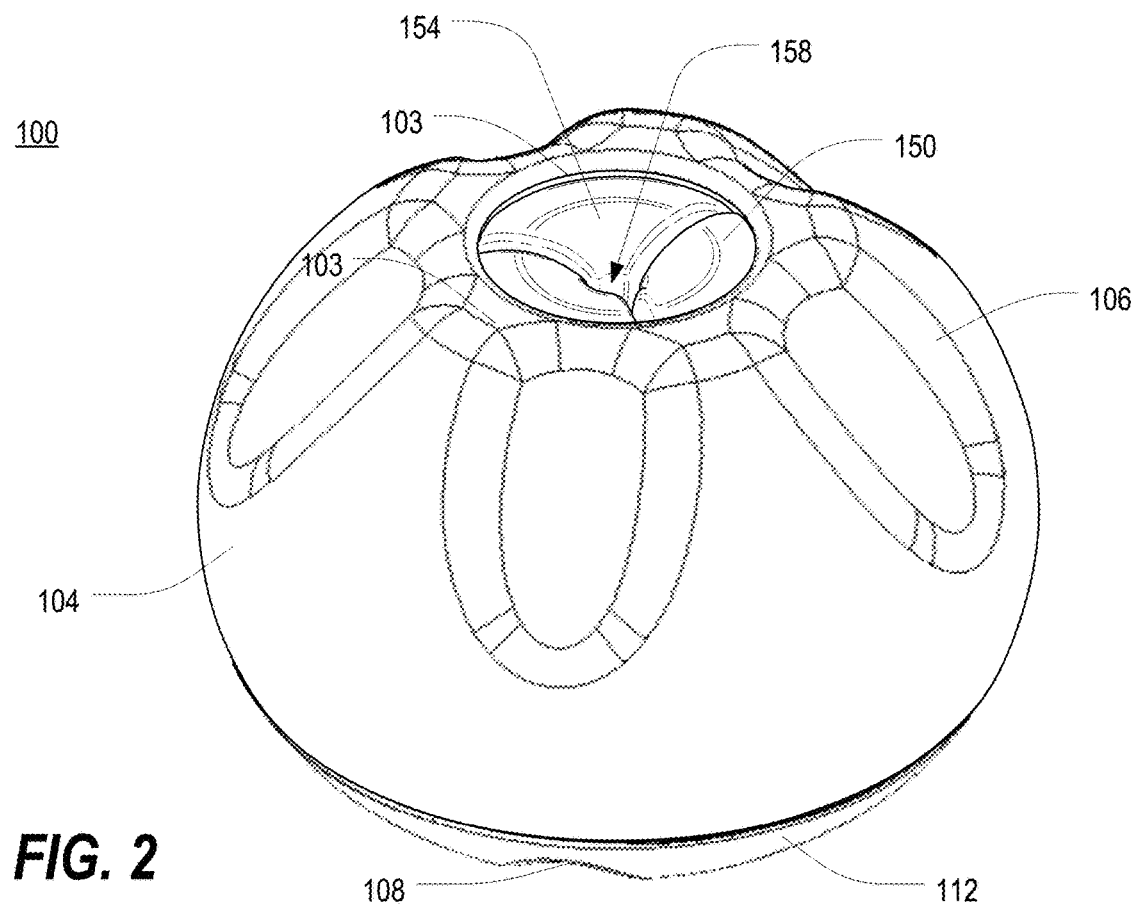
FIG. 2 is an isometric view of the self-righting stick holder of FIG. 1.

FIG. 1 is an illustration of a pet 20 with a collet-equipped self-righting stick holder 100, holding a stick-shaped pet treat 10 therein, in accordance with one or more preferred embodiments of the present invention, and FIG. 2 is an isometric view of the self-righting stick holder 100 of FIG. 1. As shown therein, the self-righting stick holder 100 includes a top shell 104, a bottom shell 112, and an internal collet 150 that is adapted to hold a stick-shaped or stick-like treat 10 or other object. As used herein, a collet is understood to include a segmented sleeve, band, or collar to utilize clamping pressure, under control of a tightening mechanism, to apply static friction to the stick-shaped or stick-like object. As described further herein, the stick-shaped treat 10 or other stick-like item is inserted into the top of the holder 100 through an opening in the top shell 104 and into a central receptacle 158 and in the collet 150.

Figure 3:
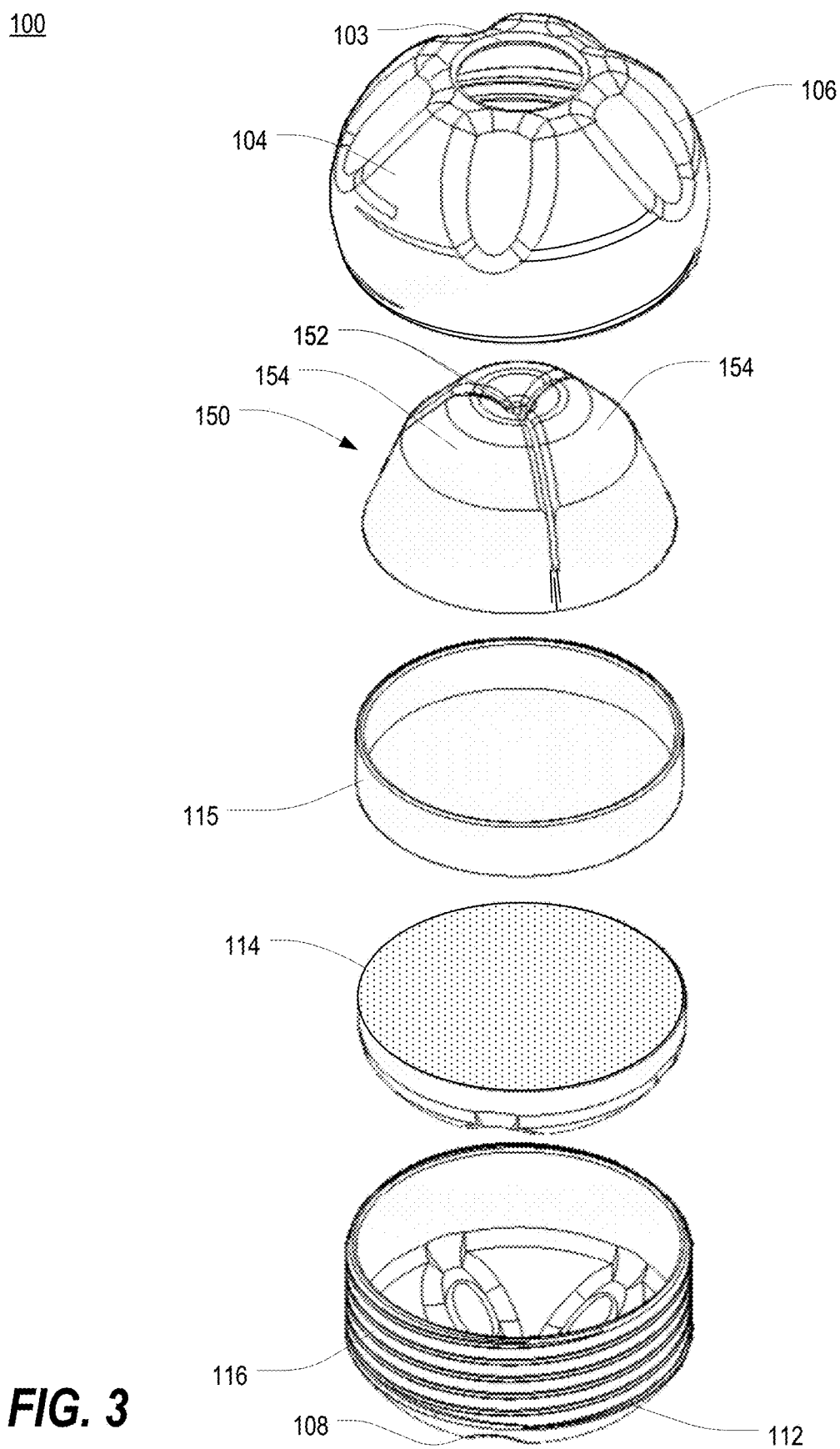
FIG. 3 is an exploded isometric view of the self-righting stick holder of FIG. 2.
Figure 4:
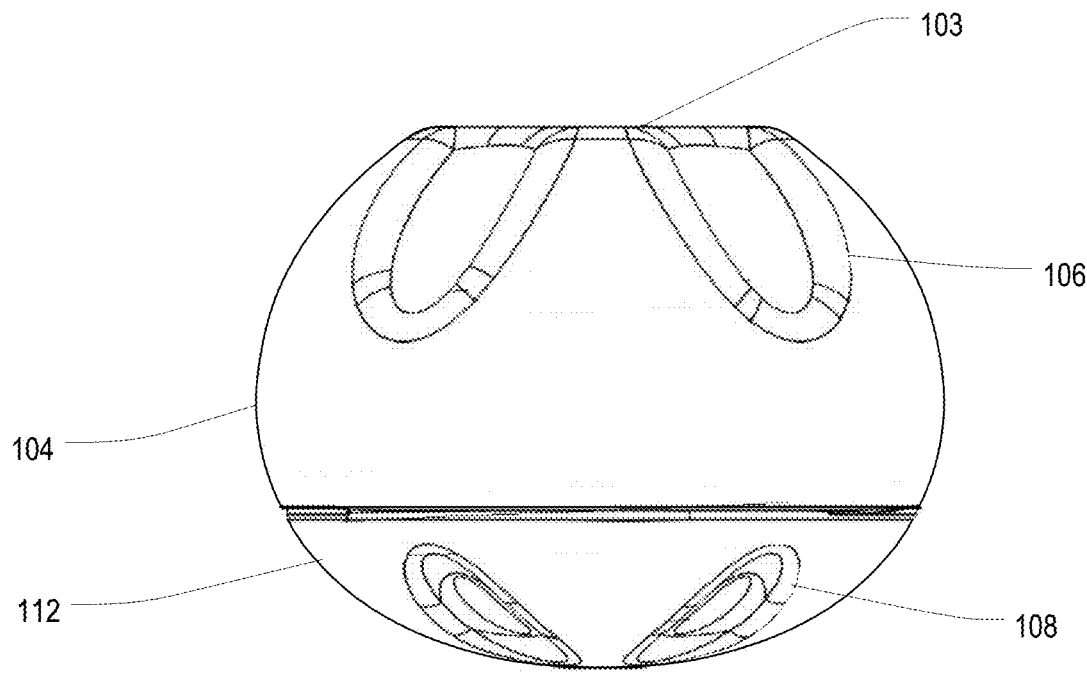
FIG. 4 is a front view of the self-righting stick holder of FIG. 2.
Figure 5:
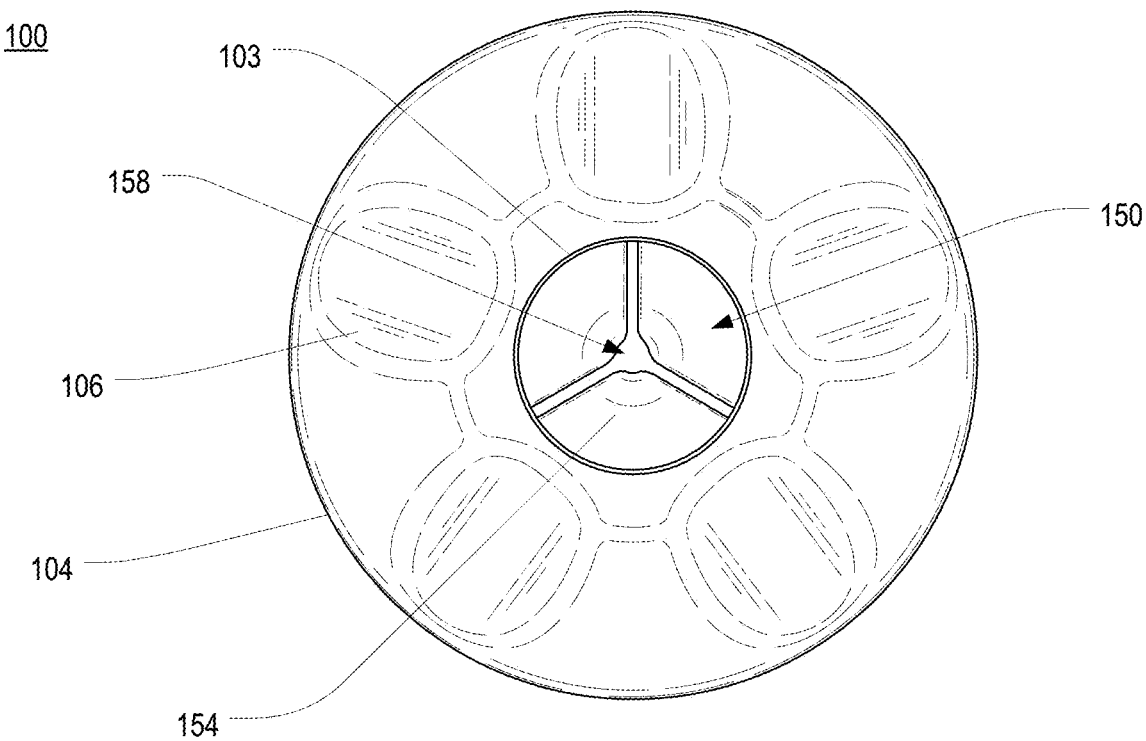
FIG. 5 is a top view of the self-righting stick holder of FIG. 2.
Figure 6:
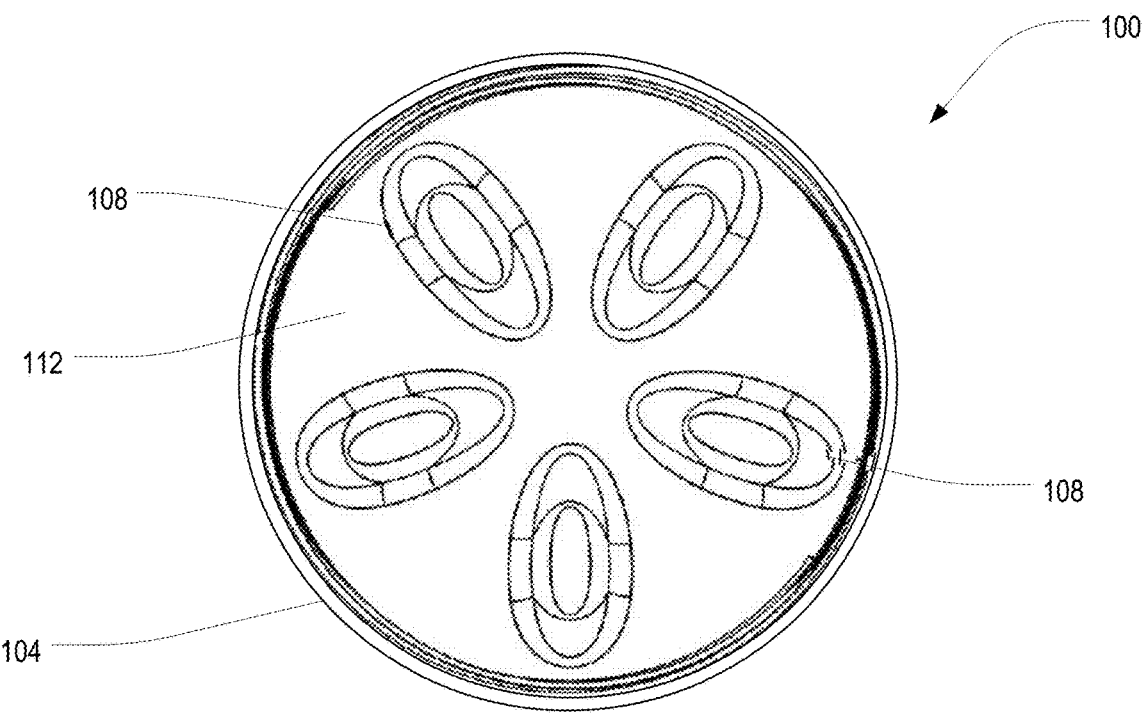
FIG. 6 is a bottom view of the self-righting stick holder of FIG. 2.

FIG. 3 is an exploded isometric view of the self-righting stick holder 100 of FIG. 2, while FIGS. 4-6 are a front view, a top view, and a bottom view, respectively, of the self-righting stick holder 100 of FIG. 2. As shown therein, the self-righting stick holder 100 includes a top shell 104, a collet 150, a ballast cap 115, a ballast 114 and a bottom shell 112. The top shell 104 includes a receiving ring 103 through which the stick-type object 10 may be inserted. The collet 150 includes a plurality of jaws 154 which contain clamping contact surfaces 152. In FIG. 3 the collet 150 is shown in a closed state, where the jaws 154 are pushed tightly together. As perhaps best shown in FIG. 4, the exterior of the bottom shell 112 has a spherical or semi-spherical profile to facilitate a smooth or relatively-smooth rolling function when the stick holder 100 is placed upright on a flat surface 12. In at least some embodiments, including that of FIGS. 1-6, portions of the top shell 104 likewise provide a spherical or semi-spherical profile to further facilitate such rolling function.

The bottom shell 112 preferably contains (or holds) ballast 114 to provide a self-righting weight and, together with the shapes of the bottom shell 112 and perhaps the upper shell 104, to support a swaying or wobbling motion of the holder 100. In various embodiments, the ballast 114 may be a single solid weight, fine or coarse granular material, water or other liquid, or any of a variety of other ballast types. In some embodiments, the ballast may be formed together with the lower shell as one piece. A ballast cap 115 may be provided to secure the ballast 114 inside the bottom shell 112. In the illustrated embodiment, the collet 150 sits on the ballast cap 115, but in other embodiments, the collet 150 may be supported by the ballast 114 itself or on a separate support structure.

Figure 8:
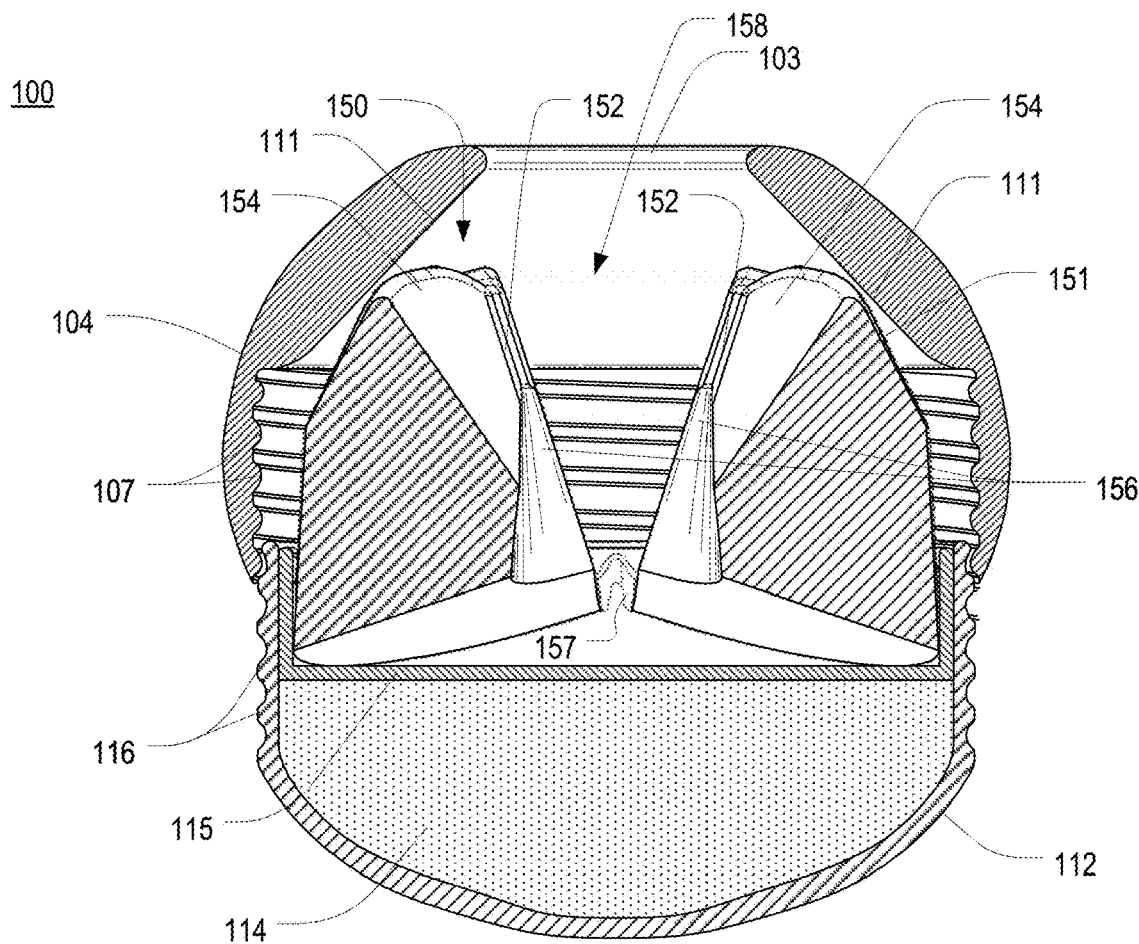
FIG. 8 is a front cross-sectional view of the self-righting stick holder of FIG. 2, shown in an open state.
Figure 9:
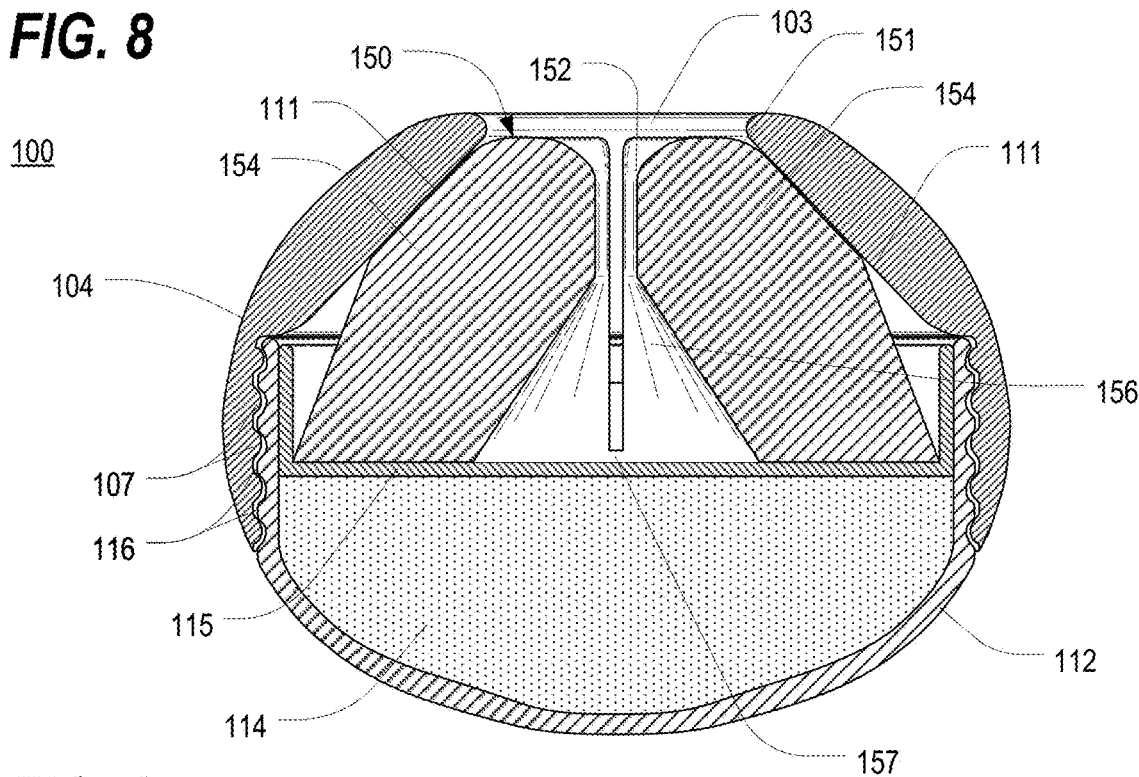
FIG. 9 is a front cross-sectional view of the self-righting stick holder of FIG. 2, shown in a closed state.

In at least some embodiments, including that of FIGS. 1-6, the top and bottom shells 104,112 may be adjusted relative to one another in order to cause the collet to shift from an open state to a closed state. To facilitate this, both the top and bottom shells 104,112 include screw threads 107,116 that allow the shells 104,112 to be screwed together, thereby compressing the collet 150 and incrementally forcing it into a closed state, or unscrewed, thereby loosening the pressure on the collet 150, allowing it to drop slightly out of the top shell 104 such that the jaws 154 can open. This is illustrated in FIGS. 8 and 9, which are front cross-sectional views of the self-righting stick holder of FIG. 2, shown in an open state and a closed state, respectively. In at least some embodiments, the top and bottom shells 104,112 both include finger grips 106,108 to make it easier for a user to grip the shells 104,112 and tighten or loosen them as much or as little as desired. Also in at least some embodiments, the top and bottom shells 104,112 are shaped with defensive geometry to repel the biting actions of a pet 20 to mitigate potential damage while being used by a pet 20.

Figure 7:
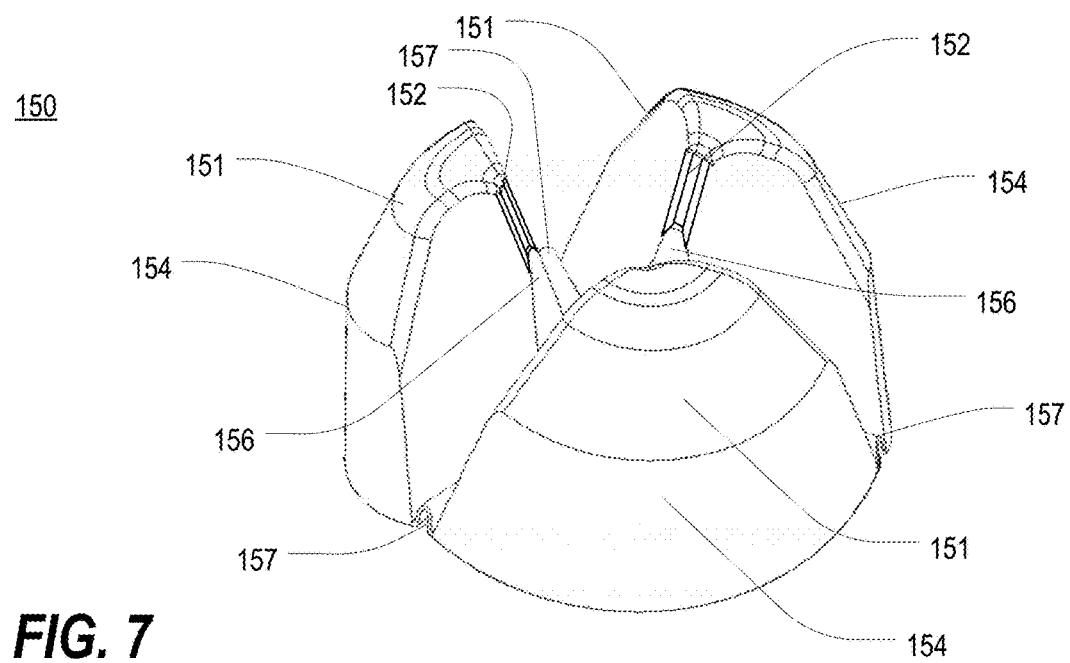
FIG. 7 is an isometric view of the collet of FIGS. 2-6, shown in an open state.
Figure 10:
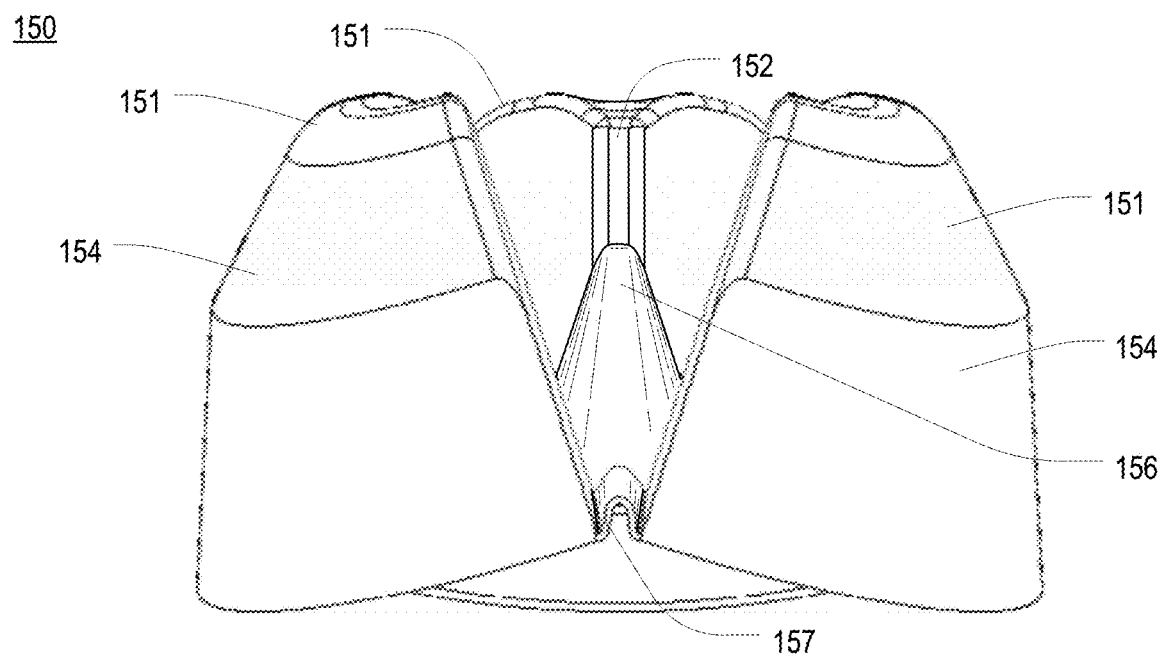
FIG. 10 is a front view of the collet of FIG. 7.
Figure 11:
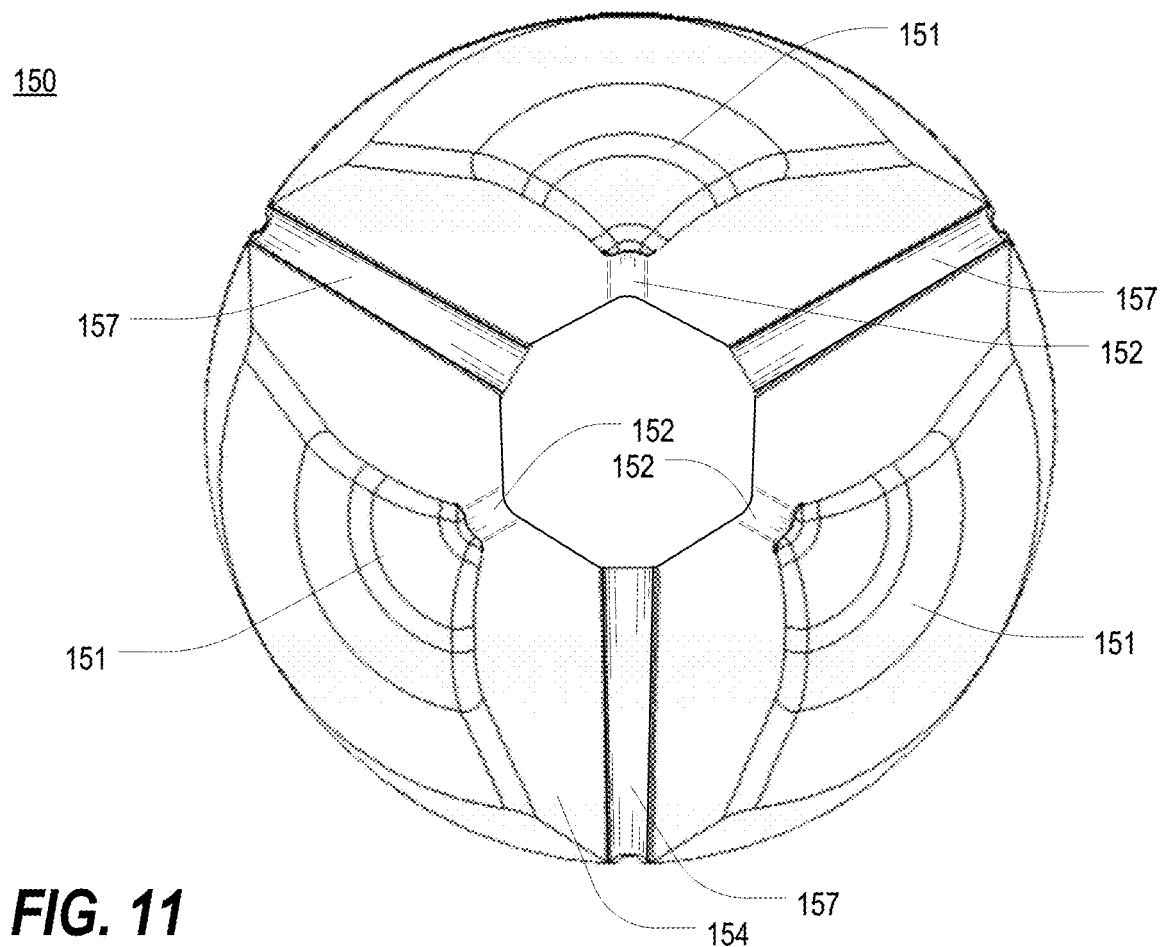
FIG. 11 is a top view of the collet of FIG. 7.

FIGS. 7, 10, and 11 are an isometric view, a front view, and a top view of the collet 150 of FIGS. 2-6, shown in the open state. In various embodiments, the collet 150 includes three jaws 154, with hinges 157 disposed between sections of the jaws 154 to connect them to each other. In at least some embodiments, the hinges 157 are living hinges that are formed or otherwise manufactured in conjunction with the jaws 154, but in at least some embodiments, other types of hinges may be utilized, including hinges manufactured separately from the jaws. As described elsewhere herein, hinges may be omitted entirely from the jaws. Each jaw 154 includes at least one contact surface 152 that is pressed against the stick-type object 10 when the collet 150 is in the closed state. By adjusting the shells 104,112 to slowly close the collet 150, more and more pressure is applied by the jaws 154, and especially by the contact surfaces 152, against sides of the object 10 to clamp the object 10 in place.

In at least some embodiments, inner portions 156 of the jaws 154 are undercut, beneath the contact surfaces 152. This avoids unintended contact between lower portions of the jaws 154 that might otherwise prevent the contact surfaces 152 from fully contacting the stick-type object 10. It may also allow the amount of force exerted by the contact surfaces 152 to be maximized.

Notably, the collet jaws 154 and the interior of the upper shell 104 have corresponding tapered, beveled, and or curved surfaces 151,111 that interact with one another so as to gradually force the collet jaws 154 together as the upper and lower shells 104 are slowly screwed together. The collet surfaces 151 do not necessarily need to be identical in shape or angle to the interior surfaces 111 of the upper shell, but the respective surfaces 151,111 are preferably designed such that the upper shell surfaces 111 continue to force the collet jaws 154 together throughout the range of the screw threads 107,116 (i.e., from only loosely tightened, where the threads 107,116 are only slightly engaged, to fully tightened). This may be accomplished, for example, using evenly tapered interior surfaces 116 and collet surfaces 151 that include an upper portion that is curved and a lower portion that is evenly tapered.

Figure 12:
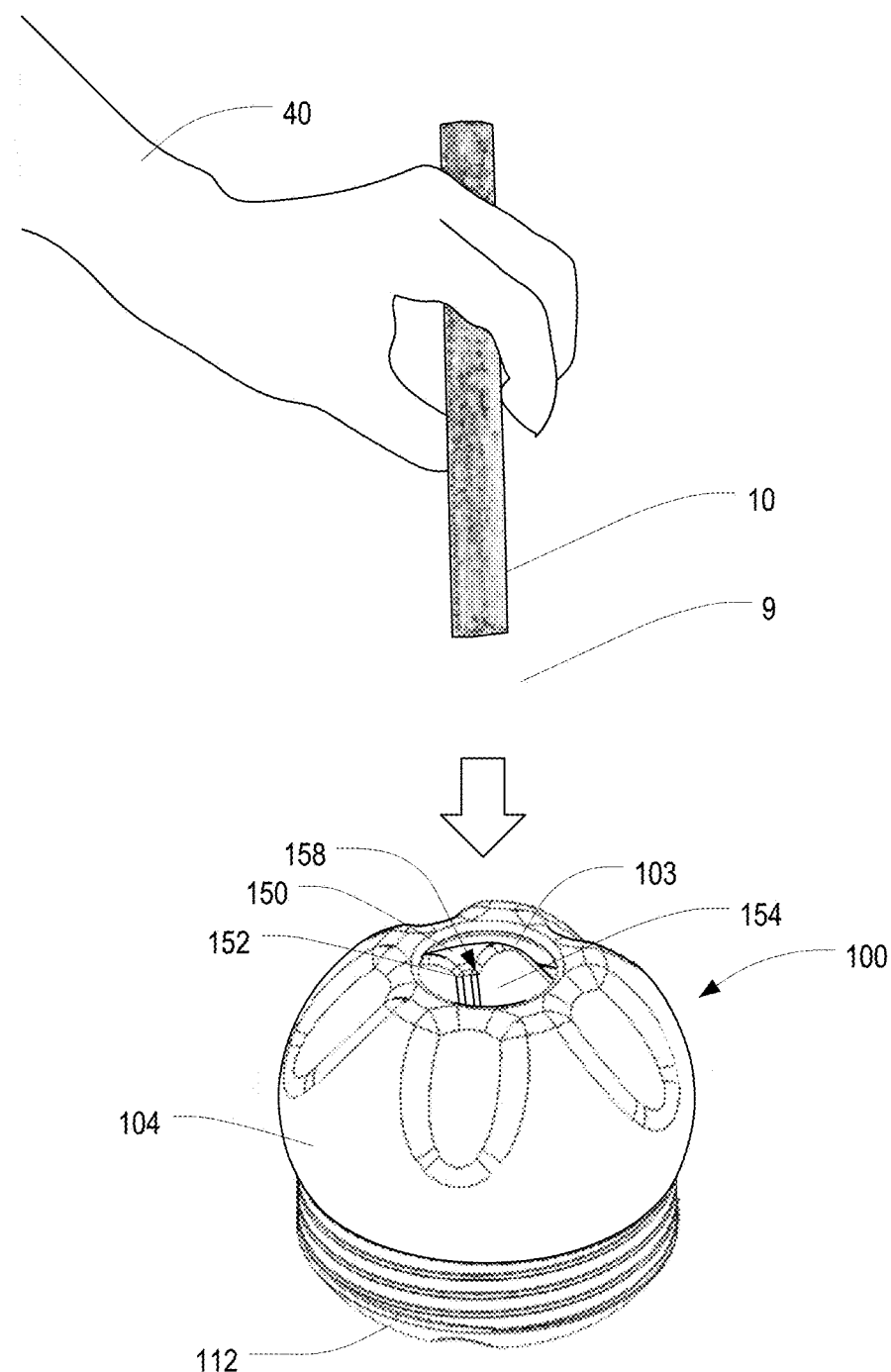
FIG. 12 is an illustration of user placing a stick treat in the open self-righting stick holder of FIG. 8.
Figure 13:
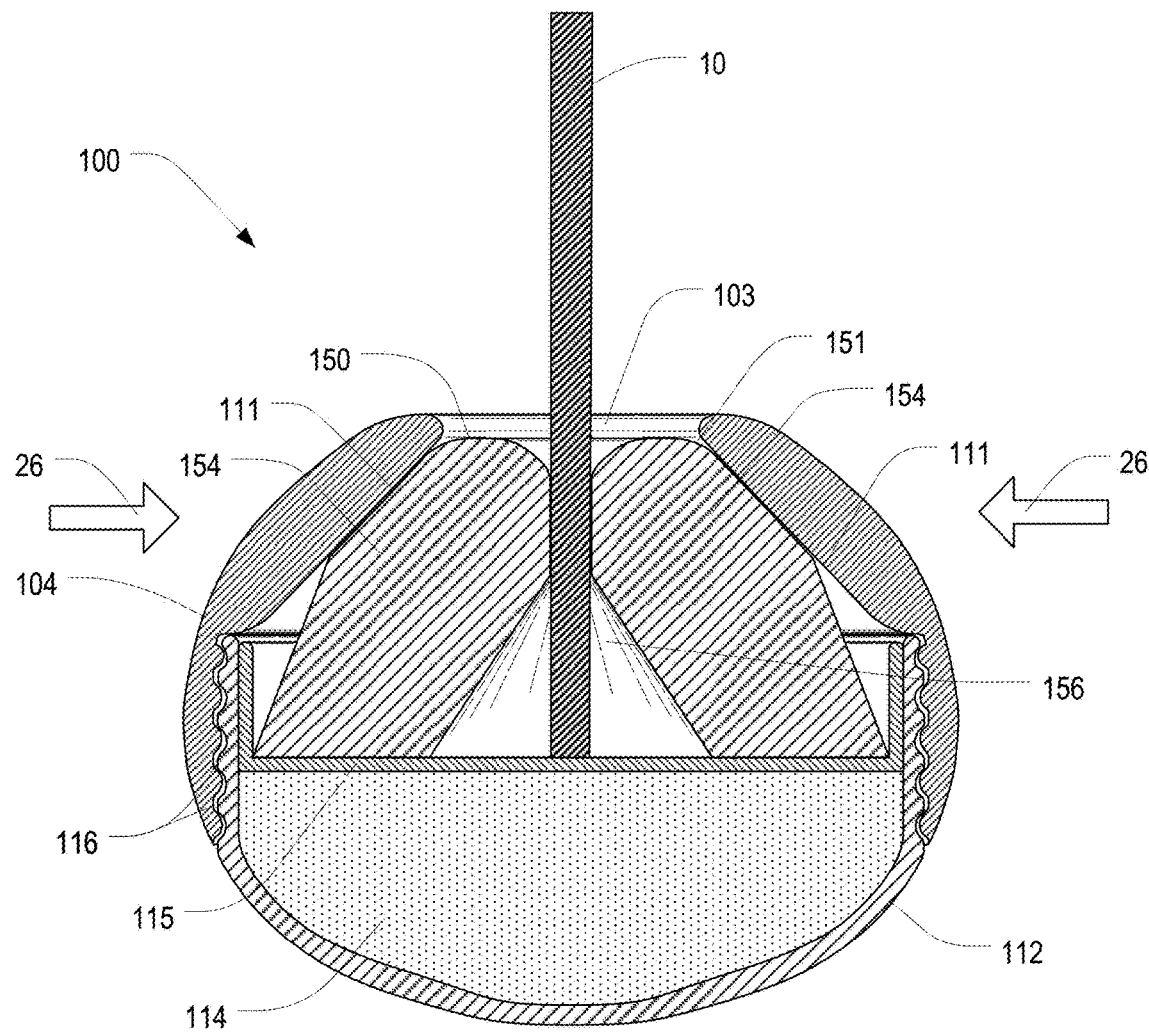
FIG. 13 is a front cross-sectional view of the self-righting stick holder of FIG. 12 shown with the stick treat fully clamped by the collet.

Use or operation of the holder 100 is straightforward. The holder 100 is first placed in the open state as shown in FIG. 8, wherein the top shell 104 is partially unscrewed from the bottom shell 112, thus releasing the force 26 of the top shell tapered surfaces 111 against the collet tapered surfaces 151. When the tapered surfaces 111 are no longer pushing against the collet 150, and more specifically the collet jaws 154, the hinged jaws 154 may open, creating the central receptacle 158 for a stick treat 10. In some embodiments, the jaws 154 are biased, via the hinges 157 or otherwise, to drop or even spring open when the top and bottom shells 104,112 are unscrewed or the like. With the hinged jaws 154 open, a stick-type object 10 may then be inserted through the receiving ring 103 and into the stick receptacle 158. In this regard, FIG. 12 is an illustration of user 40 placing a stick treat 10 in the open self-righting stick holder 100 of FIG. 8. Once the stick-type object 10 is at least partially inserted into the central receptacle 158, the top shell 104 may be screwed more tightly to the bottom shell 112. This, in turn, causes the tapered surfaces 111 to push against the collet jaws 154, forcing the collet jaws 154 to close and significantly decreasing the size of the central receptacle 158, which allows the contact surfaces 152 to clamp down on the stick-type object 10. In this regard, FIG. 13 is a front cross-sectional view of the self-righting stick holder 100 of FIG. 12 shown with the stick treat 10 fully clamped by the collet 154.

Figure 14:
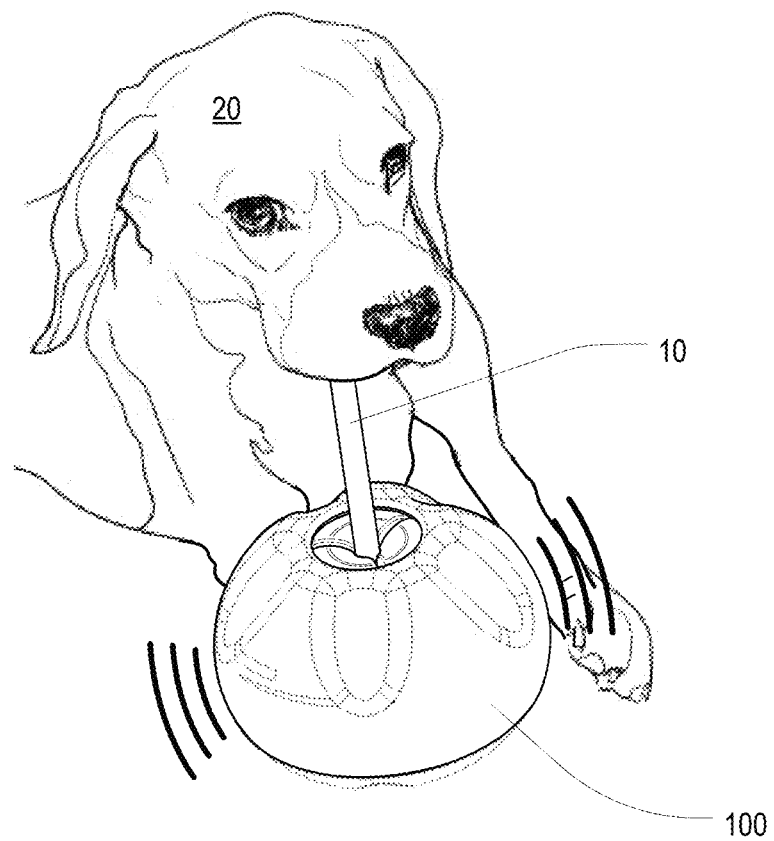
FIG. 14, which is an illustration of the pet of FIG. 1 interacting with the self-righting stick holder and stick-shaped pet treat.

With the stick-type object 10 held securely within the holder 100, the holder may be offered to a dog 20 or other pet. The dog 20 naturally chews, bites, or otherwise interacts with the stick 10, somewhat similarly to how the dog would interact with the stick 10 in the absence of the holder 100. However, the holder 100 provides at least two additional functions. First, the holder 100 provides a larger object with which the dog 20 can interact than is provided by the stick 10 alone. Second, and perhaps more importantly, the holder 100 provides a natural swaying or wobbling effect that generates additional interest for the dog and helps keep them occupied. This is illustrated in FIG. 14, which is an illustration of the pet 20 of FIG. 1 interacting with the self-righting stick holder 100 and stick-shaped pet treat 10. As shown therein, the stick holder 100 sways or wobbles back and forth as the dog 20 plays with it, and/or rights itself when released by the dog 20. Notably, the ballast 114 tends to cause the holder 100 to return to an upright position when not held in place by the dog 20, thereby causing the swaying or wobbling effect. Also notably, in at least some embodiments, the holder 100 is designed and balanced so that the stick-shaped pet treat 10 tends to be vertically oriented when the holder 100 is allowed to return to its natural orientation.

Figure 15:
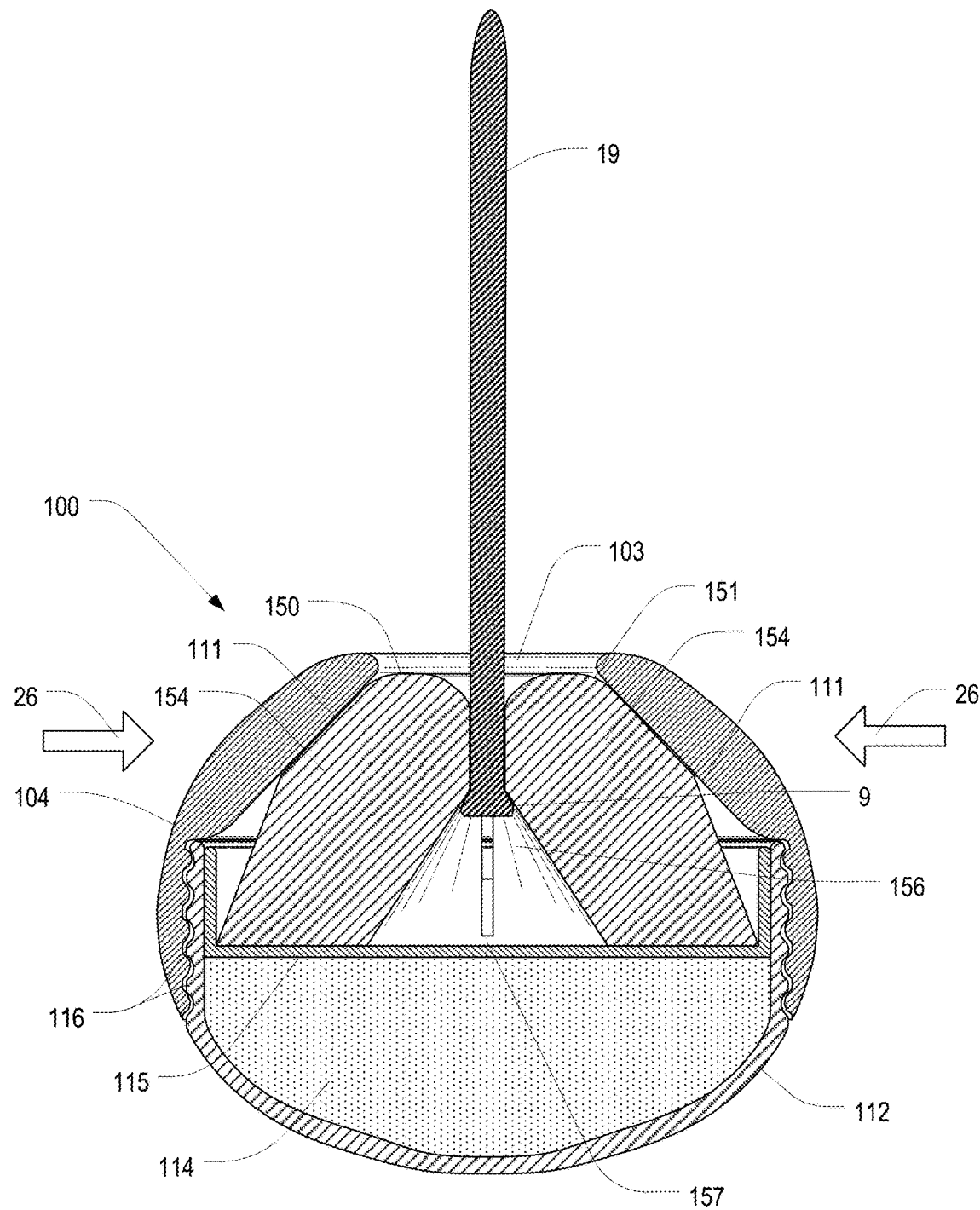
FIG. 15 is a front cross-sectional view of the self-righting stick holder of FIG. 12 shown with a stick having a stop block clamped by the collet.

In some embodiments, special stick-type objects may be provided with structural features to make it even more difficult for the object to be removed from the holder 100 without unscrewing the shells 104,112 from one another. In this regard, FIG. 15 is a front cross-sectional view of the self-righting stick holder 100 of FIG. 12 shown with a stick 409 having a stop block 9 clamped by the collet 150. As used herein, a stop block 9 is an enlarged area of a lower end of the stick-type object, of suitable size and shape, that may be produced when molding the stick 409, edible toothbrush 16, or the like, or when otherwise manufacturing a stick-type object. The stop blocks 9 may be caught by corresponding structures or features of the jaws 154, such as the undercut portions of the jaws 154 as shown in FIG. 15, thereby making it potentially impossible to withdraw the stick 19 from the jaws 154 without damaging the stick 19, the jaws 154, or the upper shell 104 due to the opposing shapes of the jaws 154, and particularly their undercut portions 156, and the stop blocks 9. In at least some embodiments, the undercut portions 156 have a shape corresponding to a portion of a cone of a given angle, and stick-type objects are manufactured with stop blocks that are generally conical with a similar conical angle relative to an axis of the stick-type object. However, a wide variety of regular and irregular surfaces and shapes may be utilized on both the undercut portions and on the stop blocks, with the general rule being that greater retaining forces may be applied by undercut portions that correspond in shape to the stop blocks on the stick-type objects being retained.

Figure 16:
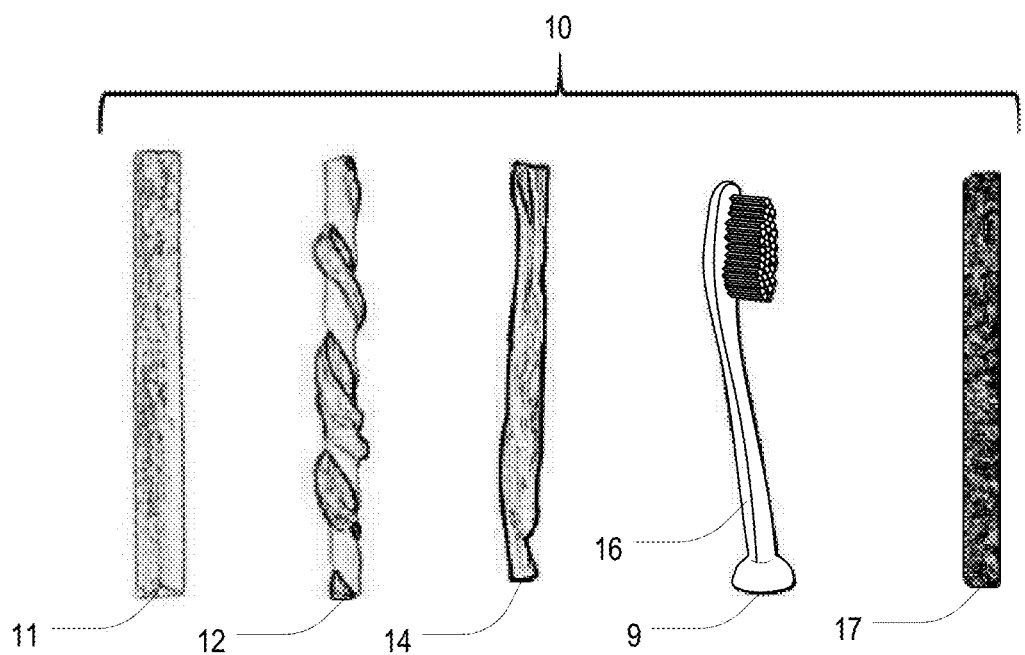
FIG. 16 are front views of various stick-shaped items for use in the self-righting stick holder of FIG. 1.

The holders described and illustrated herein may accommodate any of a wide variety of stick-type objects. In this regard, FIG. 16 illustrates various stick shaped items 10 for use in the self-righting stick holder 100 of FIG. 1. Stick-shaped items 10 suitable for use with the present invention may include but are not limited to bully sticks 11, rawhides 12, pork twists 14, molded edible shapes such as a toothbrush 16, and catnip sticks 17. As noted previously, stop blocks 9 may be included on at least some stick-shaped objects 10.

Figure 17:
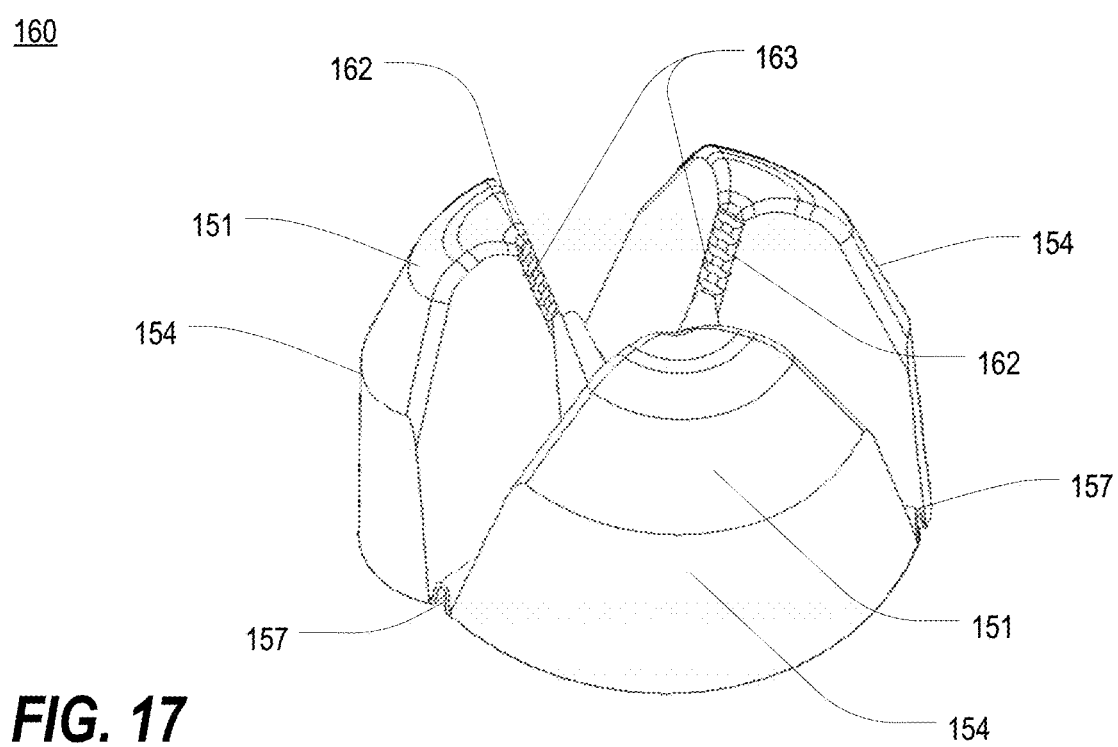
FIG. 17 is an isometric view of another collet, shown in an open state, for use in the self-righting stick holder of FIG. 1 in accordance with one or more preferred embodiments of the present invention.

The contact surfaces 152 of the collet 150 described thus far are shown as being smooth surfaces, but it will appreciated that greater gripping force may be possible using teeth or other structures on the contact surfaces. In this regard, FIG. 17 is an isometric view of another collet 160, shown in an open state, for use in the self-righting stick holder 100 of FIG. 1 in accordance with one or more preferred embodiments of the present invention. The collet 160 is generally similar to collet 150 described above but includes contact surfaces 162 with teeth 163 for additional gripping force on the stick-shaped item 10.

Figure 18:
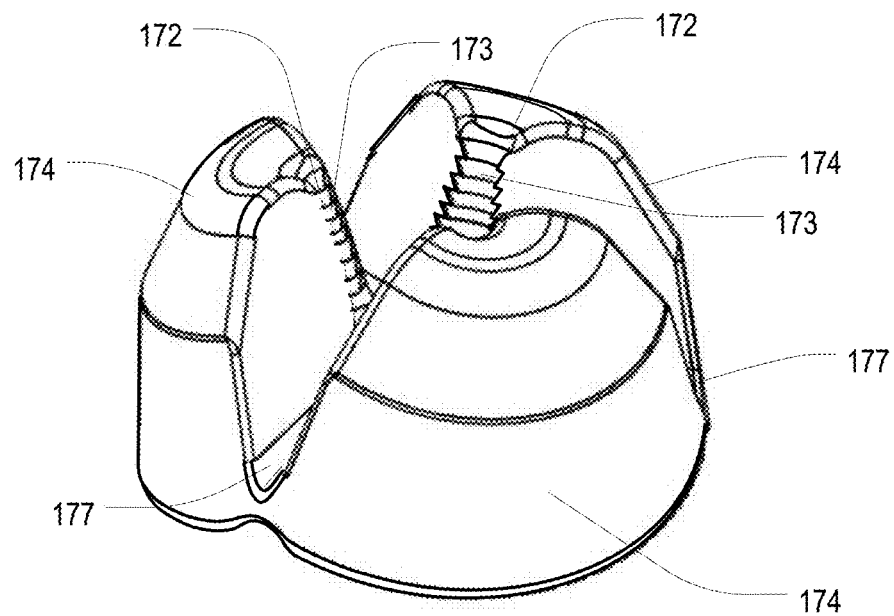
FIG. 18 is an isometric view of another collet, shown in an open state, for use in the self-righting stick holder of FIG. 1 in accordance with one or more preferred embodiments of the present invention.
Figure 19:
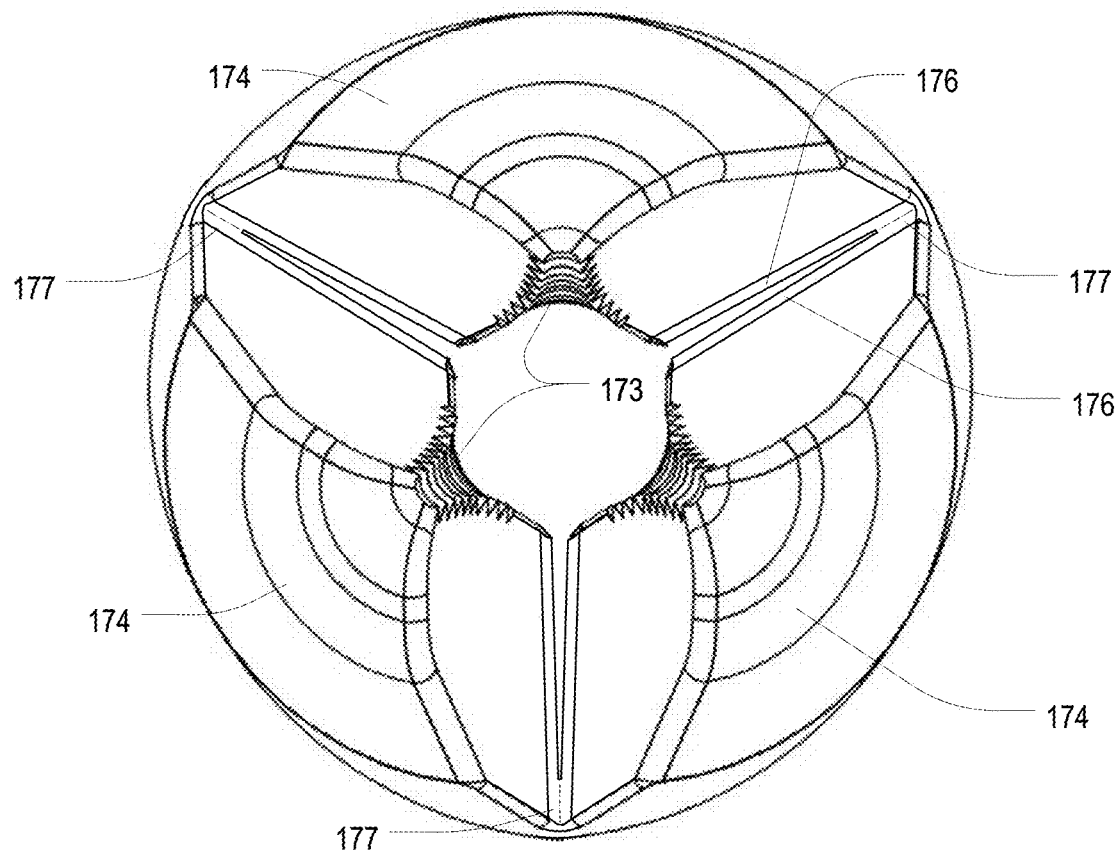
FIG. 19 is a top view of the collet of FIG. 18.

As perhaps best shown in FIG. 11, the living hinges 157 of the collets 150,160 shown and described thus far each have the form of a wrinkle or flap of material that extends the full length of the intersection between adjacent jaws 154. However, hinges of different forms may alternatively be utilized. In this regard, FIGS. 18 and 19 are an isometric view and a top view, respectively, of another collet 170, shown in an open state, for use in the self-righting stick holder 100 of FIG. 1 in accordance with one or more preferred embodiments of the present invention. Similarly to the other collets 150,160 for use in the self-righting stick holder 100, this collet 170 includes jaws 174, contact surfaces 172, and hinges 177. As with the collet 160 of FIG. 17, teeth 173 are provided on the contact surfaces 172, although they are more numerous and cover a greater extent of the jaws 174 than those of the collet 160 of FIG. 17. Whereas the previous hinges 157 close with a fold between the two jaws 154, the jaws 174 are hinged together such that when folding the sides of the hinge 177 the jaws 174 close flat without a flap of material therebetween. Also, as shown in FIG. 19, the hinges 177 connect only short distal portions of adjacent jaws 174 together, with a narrow gap being present the rest of the way between each pair of adjacent jaws 174. In particular, although each jaw 174 has a base that is generally proportional in size to the base of each jaw 154,164 in the two previous collets 150,160, and the length of each radial side 176 of each jaw base is proportional to the jaw bases of the two previous collets 150,160, the jaw bases are connected along less than half the total radial length of the jaw base, and preferably connected along less than one quarter of the total radial length of the jaw base, and more preferably connected along about one sixth of the total radial length of the jaw base, with the connection being at or near the outermost portions of the jaws 174. This type of hinge may better facilitate operation of the jaws 174 as they open and/or close.

Figure 20:
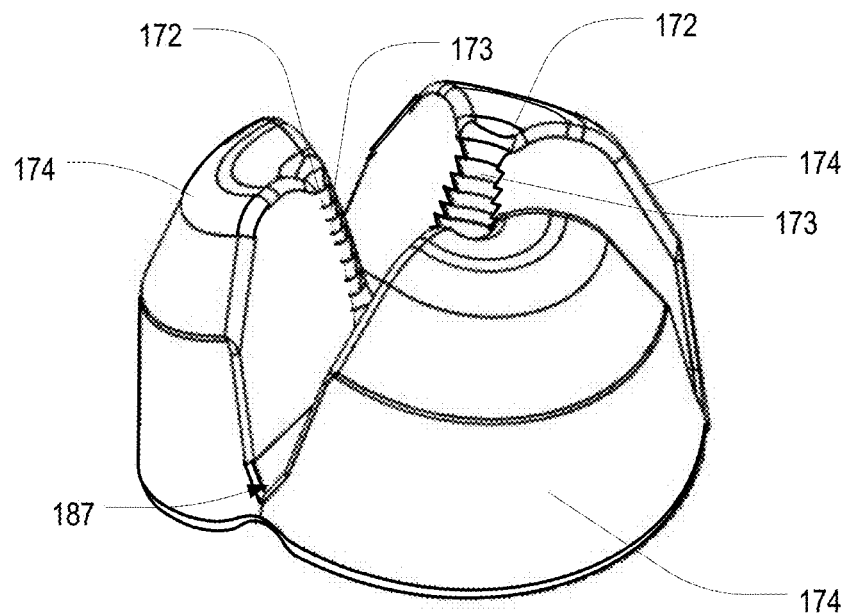
FIG. 20 is an isometric view of another collet, shown in an open state, for use in the self-righting stick holder of FIG. 1 in accordance with one or more preferred embodiments of the present invention.
Figure 21:
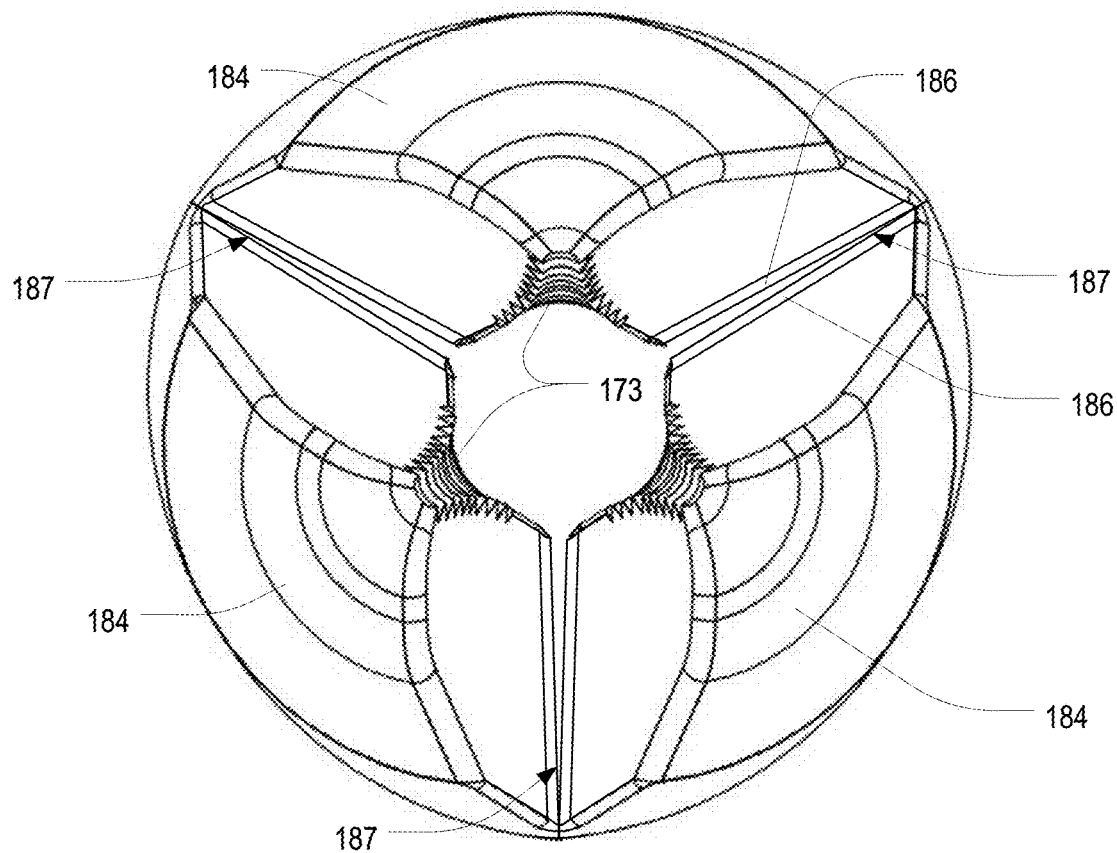
FIG. 21 is a top view of the collet of FIG. 20.

In some embodiments, hinges may be omitted entirely. In this regard, FIGS. 20 and 21 are an isometric view and a top view, respectively, of another collet 180, shown in an open state, for use in the self-righting stick holder 100 of FIG. 1 in accordance with one or more preferred embodiments of the present invention. The collet 180 is similar to the collet 170 of FIGS. 18 and 19 and includes jaws 184 and contact surfaces 172, but it does not include hinges. Instead, a gap 187 may exist between the radial sides 186 of adjacent jaws 184, and the radial sides 186 are free to move relative to the radial sides 186 of the adjacent jaws 184. Independent movement of the jaws 184 potentially makes it easier for the jaws 184 to clamp around irregular stick-type objects 10 because the various jaws 184 may more readily be deflected by different amounts when not physically tethered to one another.

Figure 22:
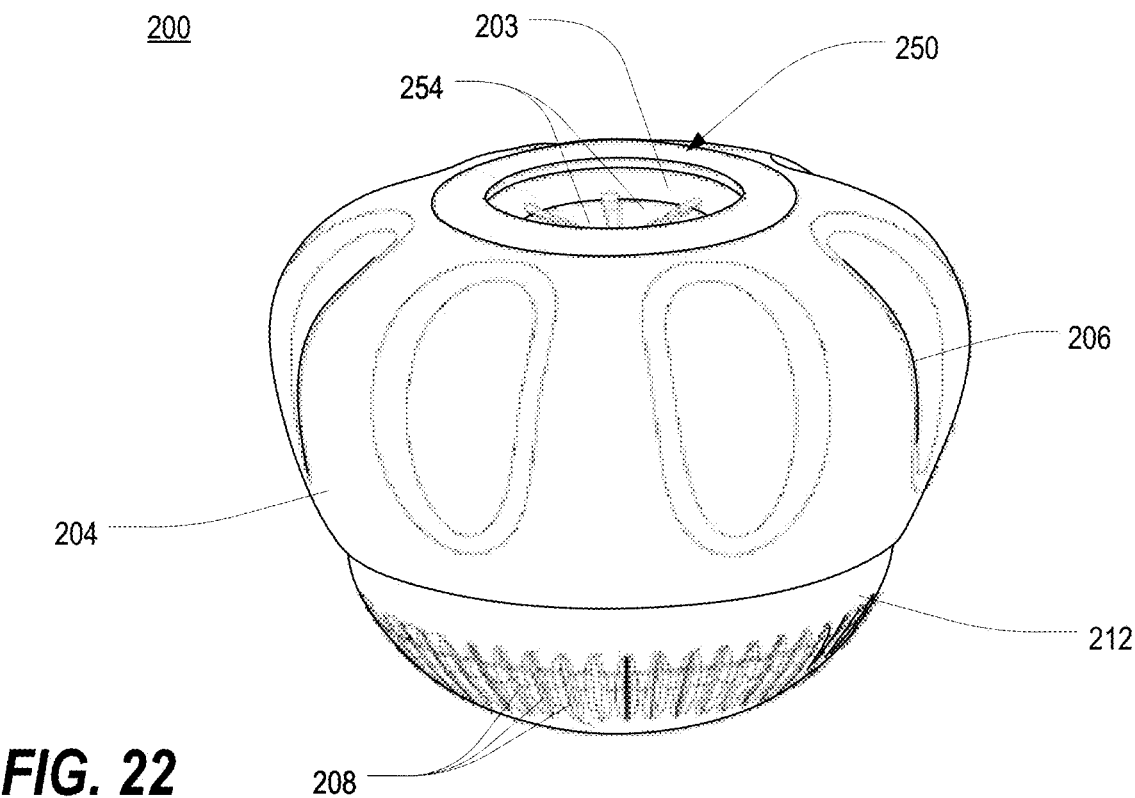
FIG. 22 is an orthogonal view of another self-righting stick holder in accordance with one or more preferred embodiments of the present invention.
Figure 23:
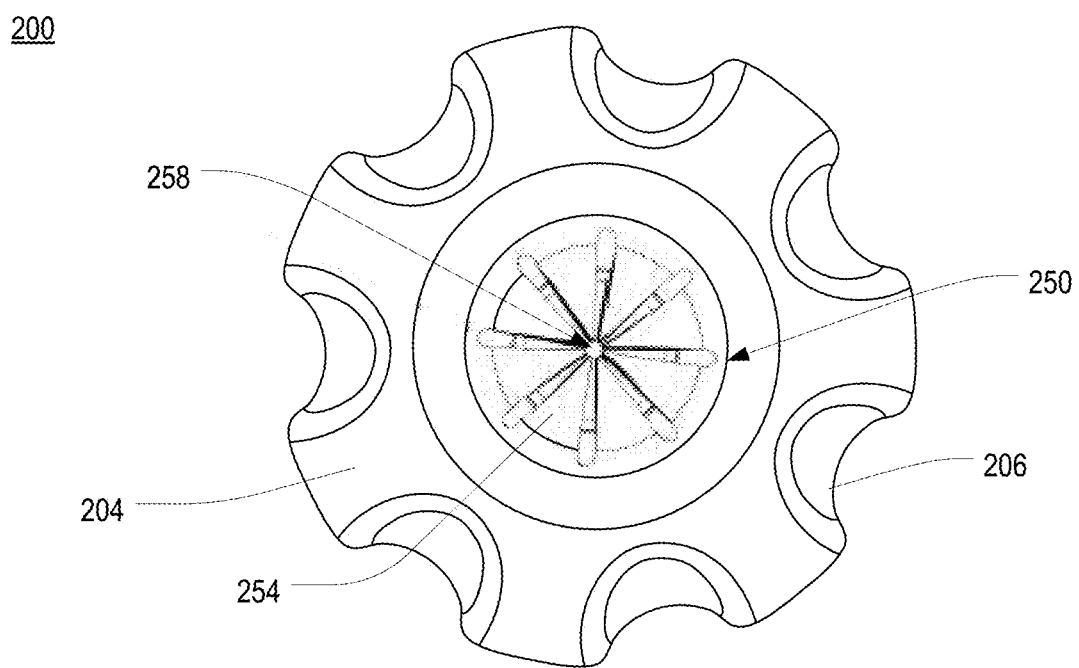
FIG. 23 is a top view of the self-righting stick holder of FIG. 22.
Figure 24:
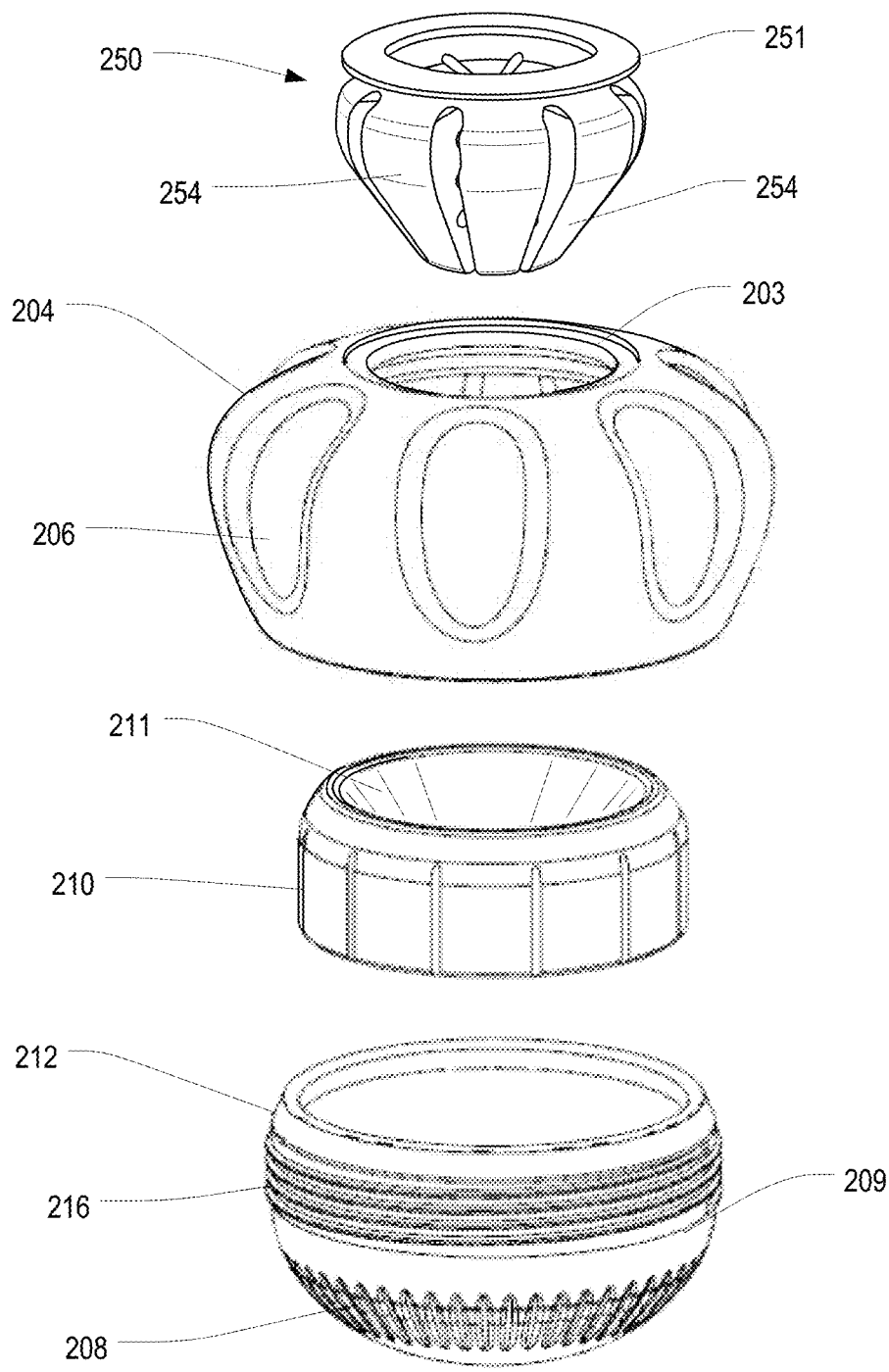
FIG. 24 is an exploded orthogonal view of the self-righting stick holder of FIG. 22.

FIG. 22 is an orthogonal view of another self-righting stick holder 200 in accordance with one or more preferred embodiments of the present invention, while FIG. 23 is a top view of the self-righting stick holder 200 of FIG. 22, and FIG. 24 is an exploded orthogonal view of the self-righting stick holder 200 of FIG. 22. Similar to the self-righting stick holder 100 FIGS. 2, 3, and 5, the self-righting stick holder 200 of FIGS. 22-24 includes a top shell 204, a bottom shell 212, and an internal collet 250. A stick treat 10 or other stick like item may be inserted through a receiving ring 203 in the top of the holder 200 and into a central receptacle 258 of the collet 250.

As perhaps best shown in FIG. 24, the self-righting stick holder 200 of FIG. 22 includes the collet 250, the top shell 204, a cinch ring 210, and the bottom shell 212. The collet 250 includes a plurality of jaws 254 and a snap ring 251 that interacts with the receiving ring 203 of the top shell 204. In FIG. 24 the collet 250 is shown in closed state, where the jaws 254 are pushed tightly together. The bottom shell 212 contains ballast (not shown) in a bottom tapered area 209 thereof to facilitate the same self-righting effect and swaying or wobbling motion described previously. The bottom shell 212 also contains or otherwise supports the cinch ring 210. In this embodiment, the cinch ring 210, rather than the top shell, includes the tapered surfaces 211. The bottom shell 212 includes screw threads 216 that mate with corresponding threads (not shown) in the top shell 204, thereby allowing the shells 204, 212 to be tightened or loosened around the collet 250. In at least some embodiments, the top shell 204 contains finger grips 206 that are somewhat similar to those of the previous top shell 104, while the bottom shell 212 includes finger grips 208 that are smaller but far more numerous. The finger grips 206,208 once again make it easier for a user to grip the shells 204,212 and tighten or loosen them as much or as little as desired.

Tightening the two shells 204, 212 forces the collet 250 into a closed state when the tapered collet jaws 254 are pushed down into the bottom shell 212 against the matching tapered surfaces 211 of the cinch ring 210. In this closed state the central receptacle 258 is contracted to a smaller diameter, thus squeezing the stick shaped item 10 to hold it securely. Because the collet 250 is secured on the receiving ring 203 on the top of the top shell 204, loosening the shells 204, 212 allows the cinch ring 210 to drop away from the collet 250 and thus the jaws 254 release outward into an open state. FIG. 23 specifically shows the collet 250 as having eight jaws 254; however, in other embodiments the number of jaws may vary.

In at least some methods of use, a user 40 threads a stick shaped treat 10 into the central receptacle 258 of the collet 250, then screws the top shell 204 and bottom shell 212 together using bottom shell screw threads 216 and top shell screw threads 217. As the top shell and bottom shells are screwed together, the tapered male surfaces of the collet jaws 254 contacts the tapered female surfaces 211 of the cinch ring 210. When the user 40 screws the top shell and bottom shell together, screw threads 216 produce screw leverage 218. As result of screw leverage 218, the opposing taper shape part designs of the collet 250 and cinch ring 210 produce clamping force 26 which is then results in collet 250 being compressed and cinched together around the stick shaped treat 10 which is then mechanically held in place by collet 250. Once a stick shaped treat 10 is held by collet 250, user 40 may then provide the present invention to a pet 20 and the pet 20 can consume the stick shaped treat 10 while being entertained by its swaying and wobbling motion.

Figure 25:
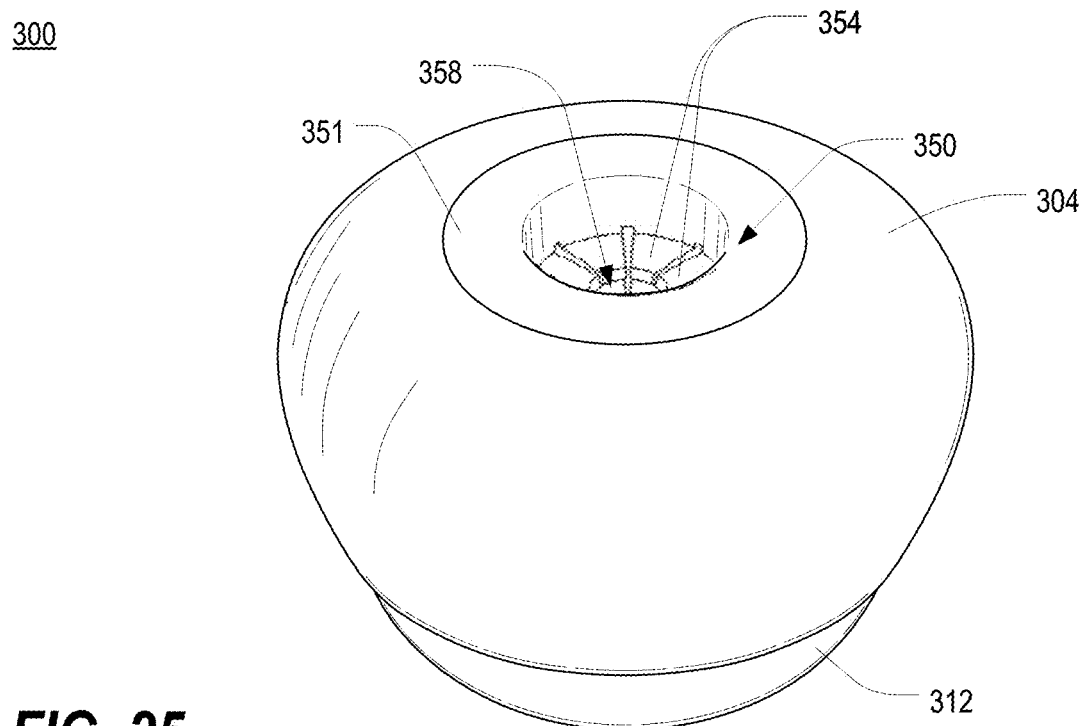
FIG. 25 is an orthogonal view of another self-righting stick holder in accordance with one or more preferred embodiments of the present invention.

FIG. 25 is an orthogonal view of another self-righting stick holder 300 in accordance with one or more preferred embodiments of the present invention. Somewhat similar to the previously described stick holders, the self-righting stick holder 300 of FIG. 25 includes a top shell 304, a bottom shell 312, and an internal collet 350, which is a segmented sleeve or collar, to hold a stick shaped treat 10. A stick treat 10 or other stick like item may be inserted through a receiving ring 303 in the top of the holder 300 and into a central receptacle 358 of the collet 350.

Figure 26:
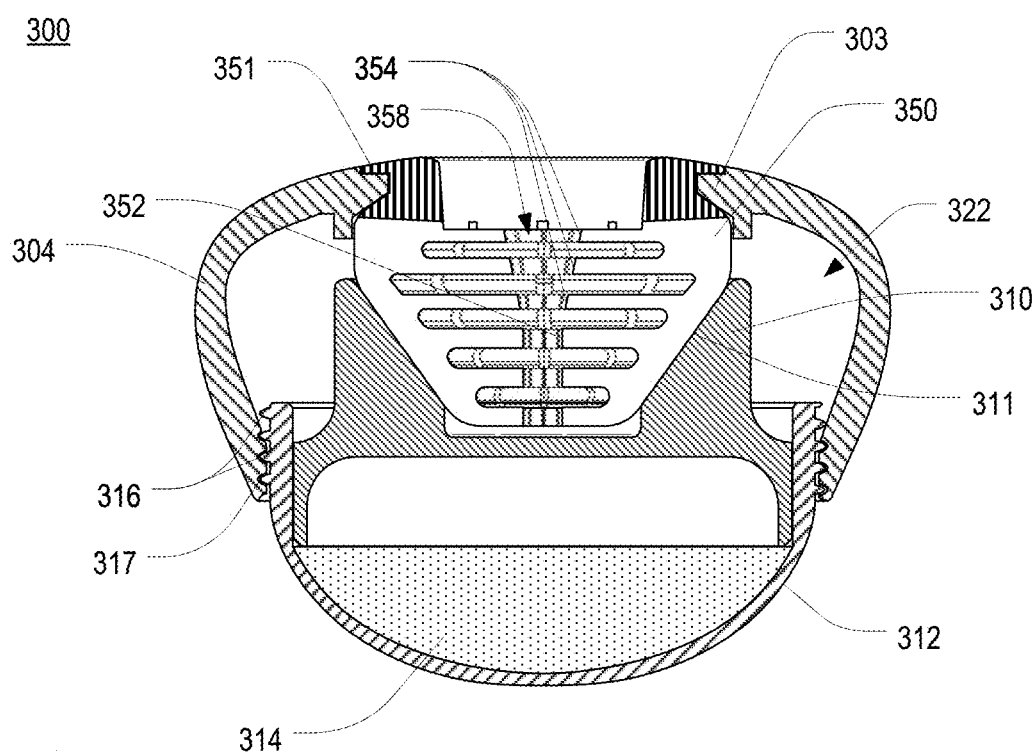
FIG. 26 is a front cross-sectional view of the self-righting stick holder of FIG. 25.

FIG. 26 is a front cross-sectional view of the self-righting stick holder 300 of FIG. 25. As shown therein, the collet 350 includes jaws 354 and a snap ring 351, which is held onto the top shell 304 by the receiving ring 303. Also shown in FIG. 26 are the receiving ring 303, screw threads 316,317, ballast 314, the cinch ring 310, the tapered surfaces 311, an open cavity 322 in the top holder 300, and the collet 350. Notably, the collet 350 includes structures functioning as teeth 352, but they are formed by multiple layers of the collet jaws 354 connected only at their outer extents, thereby giving them more freedom to move slightly to conform to irregular surfaces of a stick-type object 10.

Figure 27:
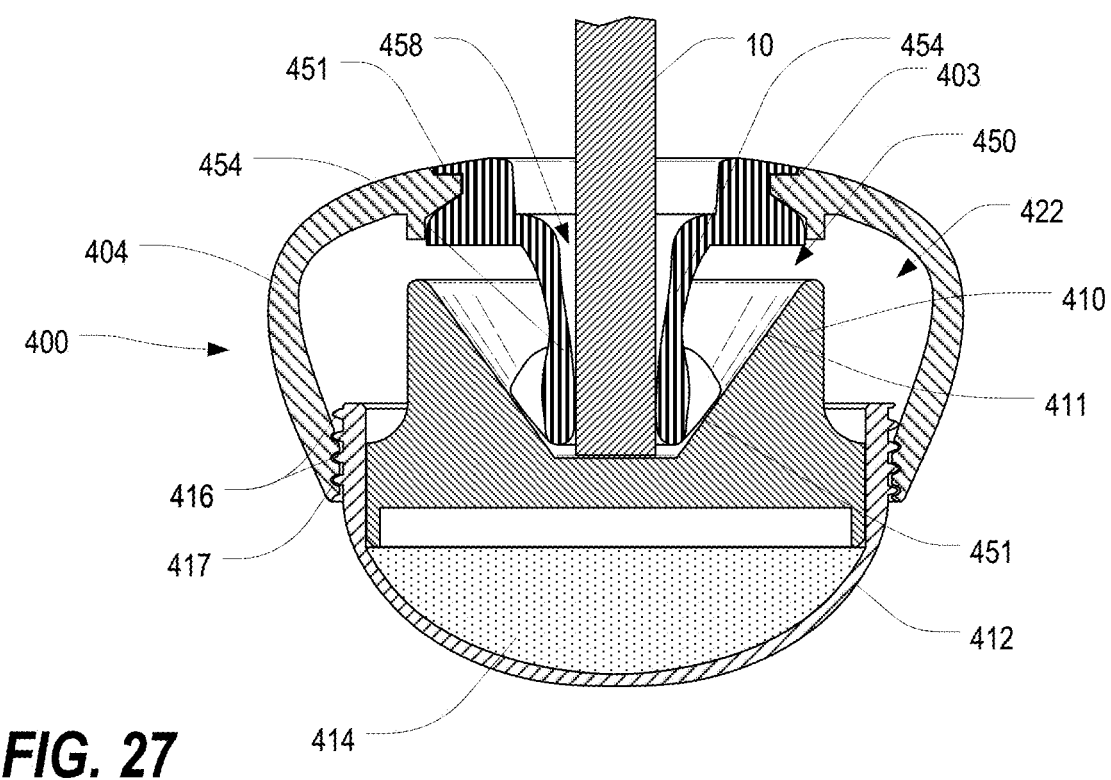
FIG. 27 is a front cross-sectional view of another self-righting stick holder in accordance with one or more preferred embodiments of the present invention.

FIG. 27 is a front cross-sectional view of another self-righting stick holder 400 in accordance with one or more preferred embodiments of the present invention. Somewhat similar to the previously described stick holders, the self-righting stick holder 400 of FIG. 27 includes a top shell 404, a bottom shell 412, a cinch ring 414 with tapered surfaces 411, and an internal collet 450, which is a segmented sleeve or collar, to hold a stick shaped treat 10. The holder 400 also includes a receiving ring 403, screw threads 416,417, ballast 414, and an open cavity 422. The collet 450 includes jaws 454 and a snap ring 451 which holds it onto the top shell 404. Notably, unlike the collet 350 of FIGS. 25 and 26, the collet jaws 454 of FIG. 27 descend from snap ring 451 directly adjacent the central receptacle 458 and include curved surfaces to interact with a stick-type object at different points or in different ways as the shells 404,412 are screwed together. Pressure is applied by the tapered surfaces 411 of the cinch ring 414 to tapered outer surfaces 451 of the jaws 454.

Figure 28:
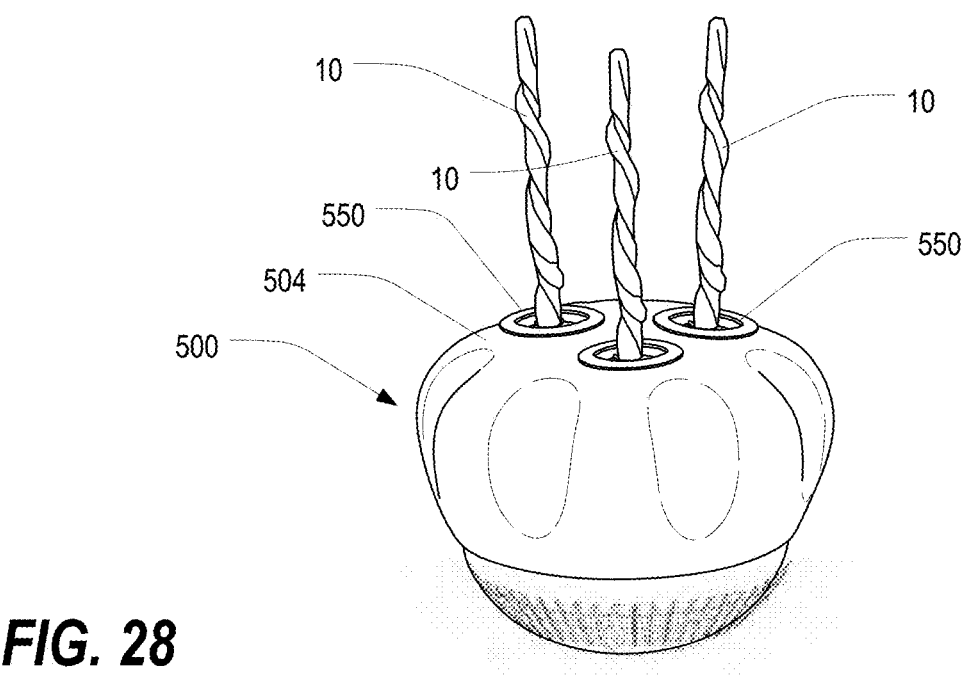
FIG. 28 is a perspective view of a self-righting stick holder with multiple collets in accordance with one or more preferred embodiments of the present invention.

In one or more preferred embodiments of the invention, a self-righting stick holder may include a plurality of collets 150,160,170,180,250,350,450, each having two or more jaws 154,164,174,184,254,354,454 that are hinged together, such that the holder may contain more than one stick-shaped item 10. In this regard, FIG. 28 is a perspective view of a self-righting stick holder 500 with multiple collets 550 in the top shell 504 in accordance with one or more preferred embodiments of the present invention.

Figure 29:
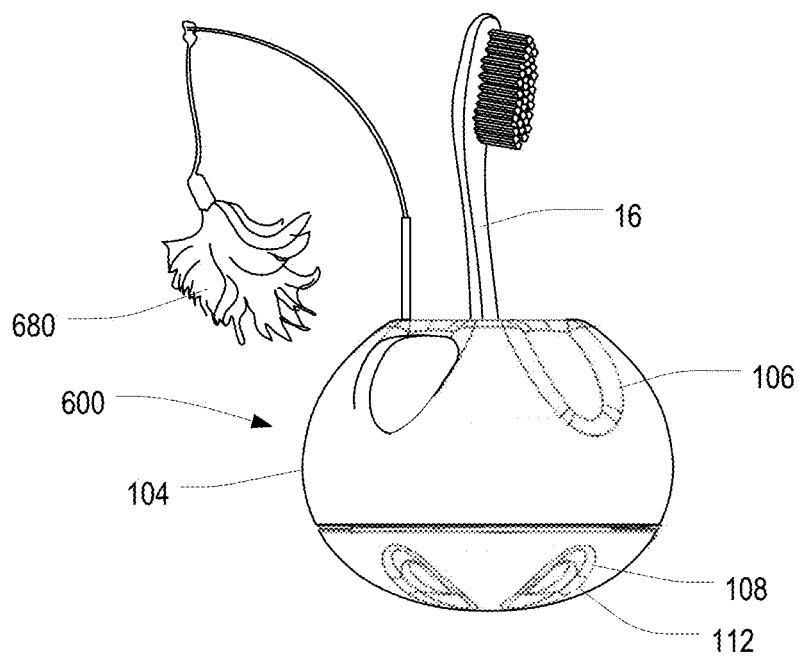
FIG. 29 is a front view of a self-righting stick holder containing a dangler and a stick-type object in accordance with one or more preferred embodiments of the present invention.

Each of the various self-righting holders described and illustrated thus far may further include one or more additional features to increase the functionality thereof. For example, FIG. 29 is a front view of a self-righting stick holder 600 containing a dangler 680 and a stick-type object (here in the form of a molded edible toothbrush product 16) in accordance with one or more preferred embodiments of the present invention. Somewhat similar to previously described stick holders, the self-righting stick holder 600 includes a top shell 104 and a bottom shell 112, finger grips 106,108, and an internal collet (not shown). The components and operation of this holder 600 are generally the same as that of FIG. 2 except that the dangler 680 provide additional interest for a pet 20.

Figure 30:
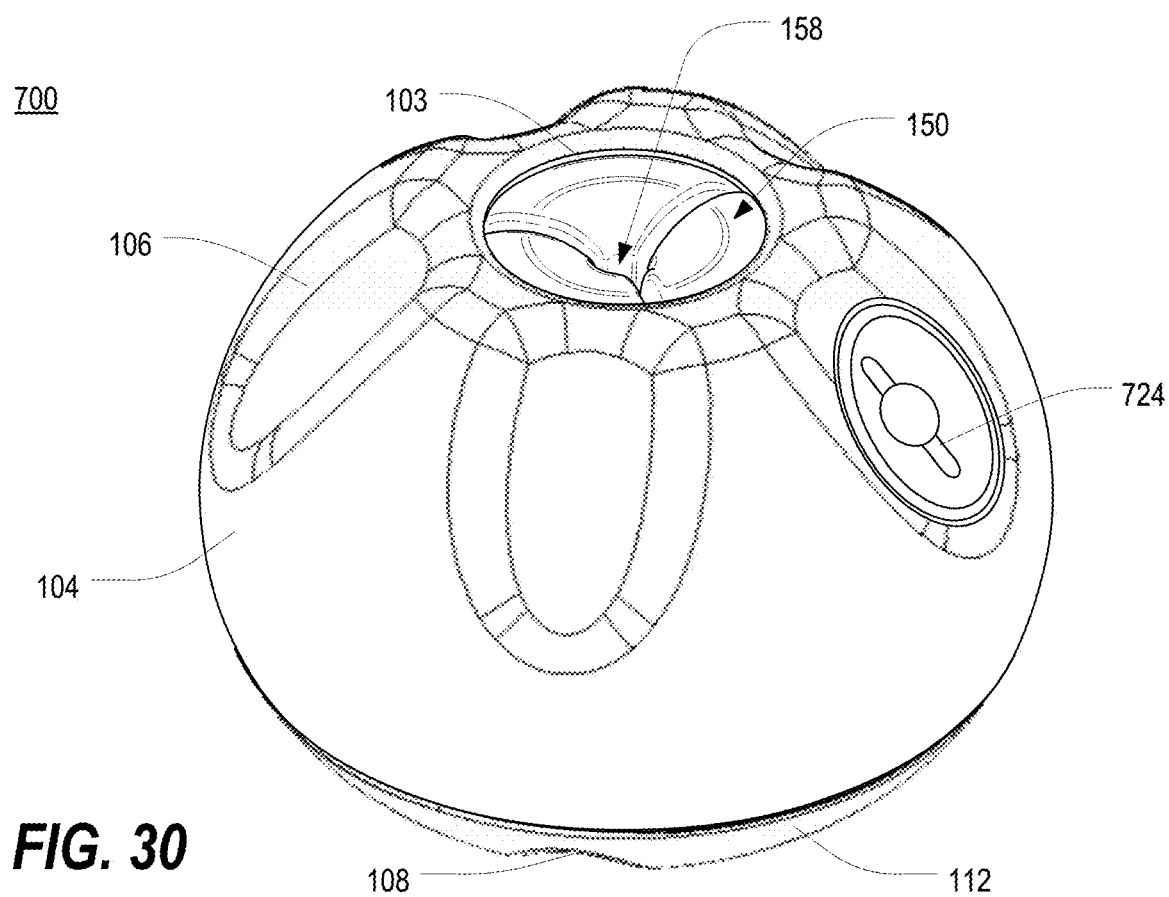
FIG. 30 is an orthogonal view of a self-righting stick holder with a handle in accordance with one or more preferred embodiments of the present invention.

FIG. 30 is an orthogonal view of a self-righting stick holder 700 with a handle 724 in accordance with one or more preferred embodiments of the present invention. Somewhat similar to previously described stick holders, the self-righting stick holder 700 includes a top shell 104, a bottom shell 112, and an internal collet 150, which is a segmented sleeve or collar, to hold a stick shaped treat 10 in the central receptacle 158. The holder 700 also includes a receiving ring 103 and finger grips 106,108.

Figure 31:
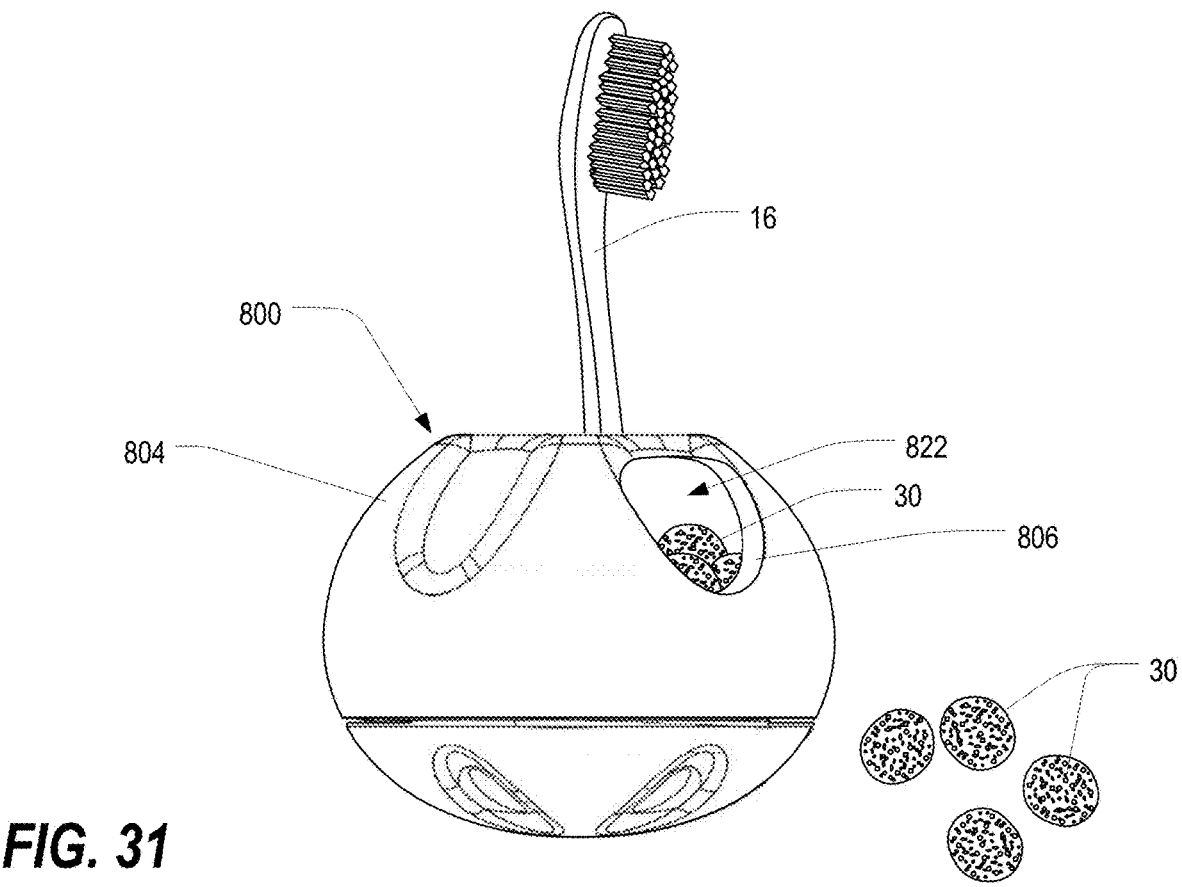
FIG. 31 is a front view of a self-righting stick holder containing kibble in accordance with one or more preferred embodiments of the present invention.

FIG. 31 is a front view of a self-righting stick holder 800 containing kibble 30 in accordance with one or more preferred embodiments of the present invention. The self-righting stick holder 800 has at least one opening 806 in the top shell 804 that is open into a cavity area 822. A user 40 can place kibble 30 in the cavity area 822, and as a pet 20 plays with the stick holder 800, the kibble 30 may be randomly dispensed through the at least one opening 806 as the holder sways and wobbles.

Figure 32:
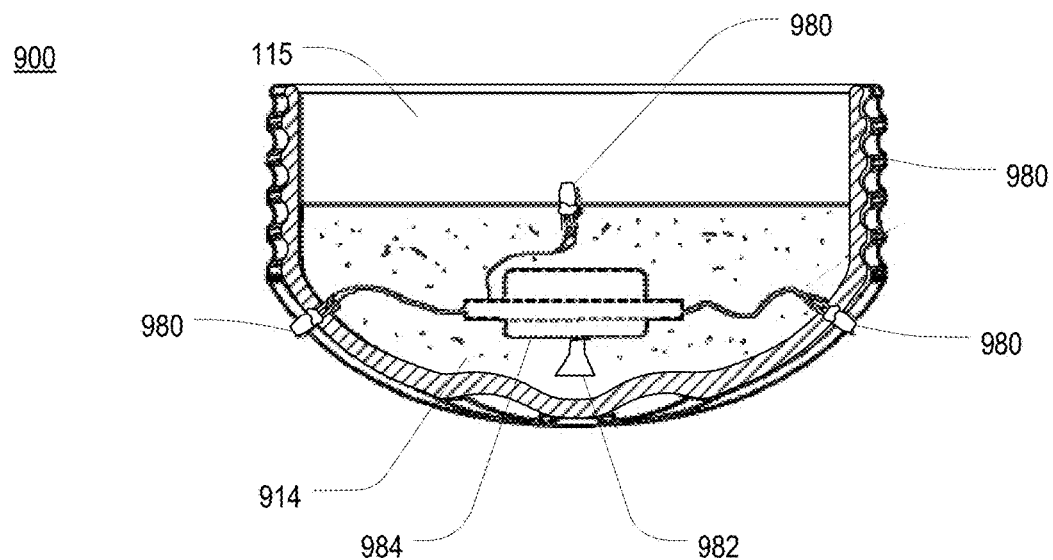
FIG. 32 is cross-sectional view of a bottom shell of a self-righting stick holder and its contents, which include a light and/or sound device, in accordance with one or more preferred embodiments of the present invention.
Figure 33:
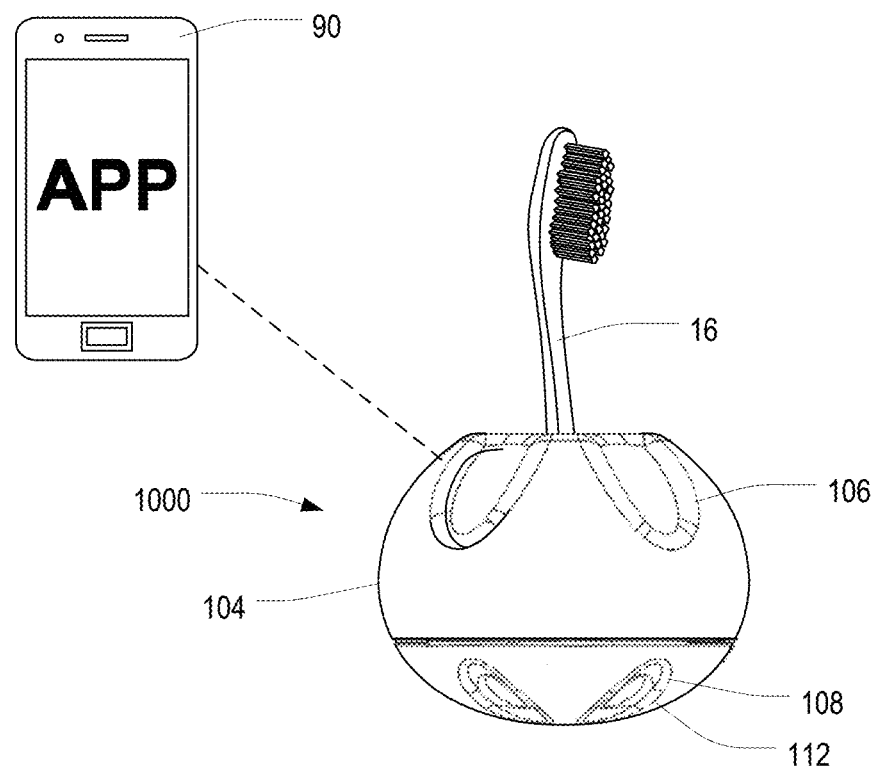
FIG. 33 is an illustration of a self-righting stick holder communicating with a mobile device in accordance with one or more preferred embodiments of the present invention.
Figure 34:
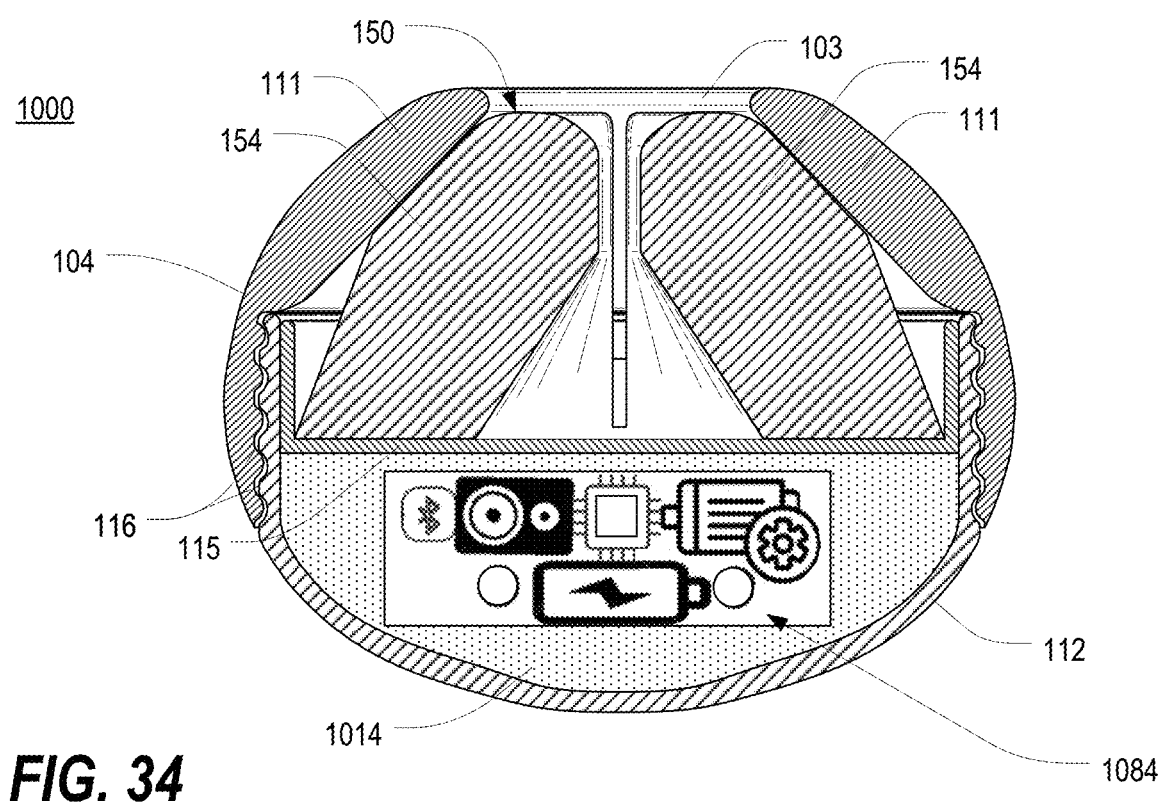
FIG. 34 is a front cross-sectional view of the self-righting stick holder of FIG. 33 illustrating interior electronics in the ballast to communicate with the mobile device.

In some embodiments, a self-righting stick holder may contain various electronics 984 for producing light, sound and/or other App controlled signals. In one example, FIG. 32 is cross-sectional view of a bottom shell 912 of a self-righting stick holder 900 and its contents, which include a light 980 and/or sound device 982, in accordance with one or more preferred embodiments of the present invention. The light 980 and/or sound device 982 may be located in the general vicinity of the ballast 914. In another example, FIG. 33 is an illustration of a self-righting stick holder 1000 communicating with a mobile device 90 in accordance with one or more preferred embodiments of the present invention. To facilitate such communication, and/or communication with other types of wireless devices, this self-righting stick holder 1000 is provided with internal electronics 1084, including such components as a software application executed using a CPU, one or more wireless transceivers, a power supply, and the like. In some embodiments, external controls may also be provided. The electronics 1084 may be located in the general vicinity of ballast 1014.

In one or more preferred embodiments of the invention, the self-righting stick holder 100,200,300,400,500,600,700, 800,900,1000 is made of rigid, semi-rigid and flexible materials suitable for pet use such as wood, plastic, nylon, rubber, thermoplastic rubber, thermoplastic elastomer, or the like. The self-righting stick holder 100,200,300,400,500, 600,700,800,900,1000 may be made in various sizes, where the various sizes can accommodate different sizes of stick shaped treats 10 or various sizes of animals such as dogs or cats. Notably, the various collets are able to adjust to hold stick-shaped treats 10 of an infinite number of sizes (within a range defined by the adjustability of the threads and the dimensions of the various components of the holders). For mass production, the self-righting stick holder 100,200,300, 400,500,600,700,800,900,1000 can be made with and injection molding process or additive manufacturing, as two example processes for manufacturing, or other such material or manufacturing processes that are known by an Ordinary Artisan or in the industry or art, that may be used for the purposes and system as described herein.

Figure 35:
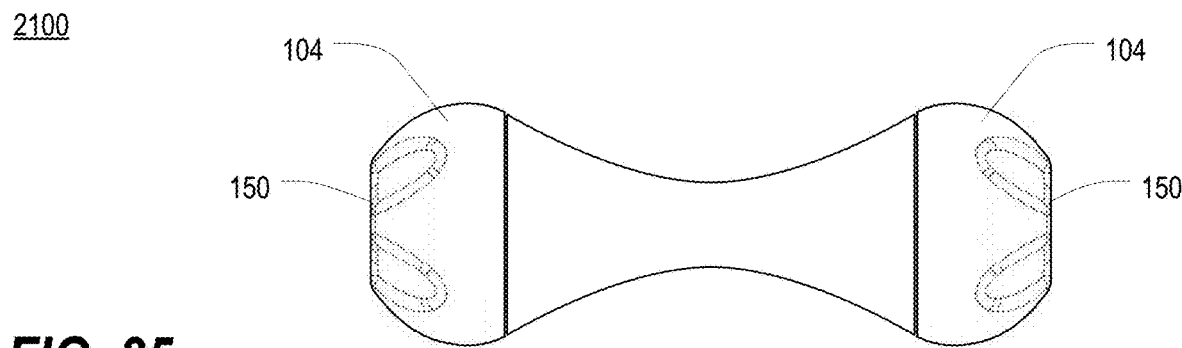
FIG. 35 is a side view of a bone-shaped stick holder containing two collets in accordance with one or more preferred embodiments of the present invention.
Figure 36:
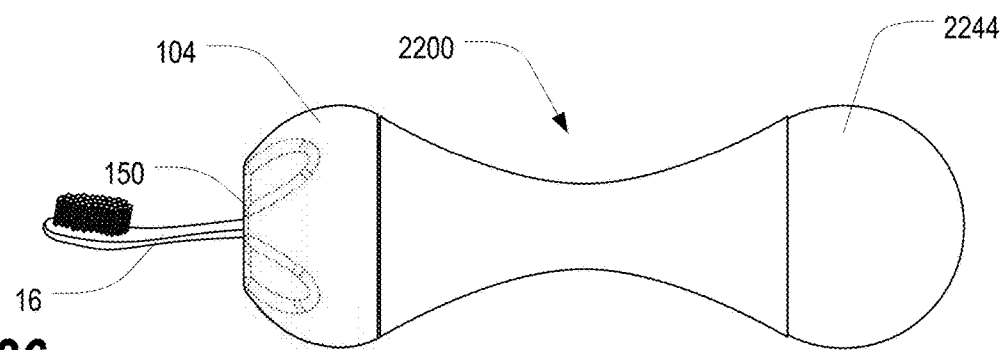
FIG. 36 is a side view of a bone-shaped stick holder containing a single collet in accordance with one or more preferred embodiments of the present invention.
Figure 37:
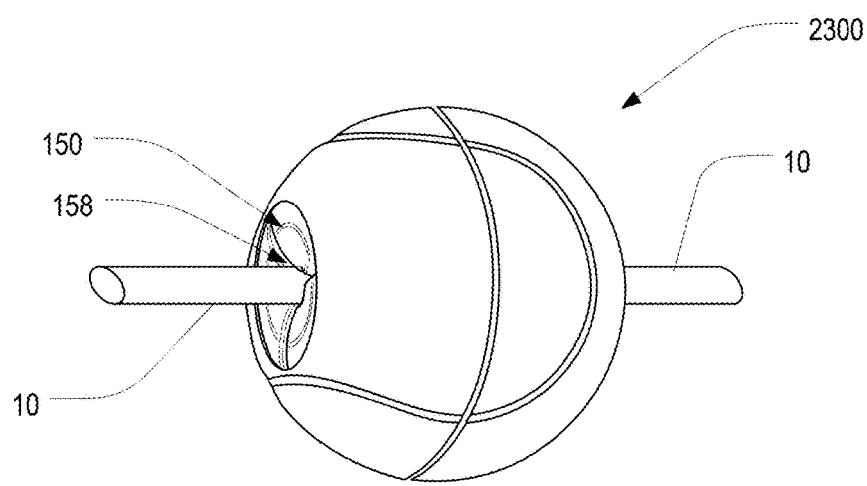
FIG. 37 is a perspective view of a ball-shaped stick holder with a collet in accordance with one or more preferred embodiments of the present invention.

In some embodiments, the various self-righting stick holders may be incorporated into a product line that also includes other stick holders making use of collets like those shown and described herein. These alternative stick holders may offer alternative motions, such as rolling effects, or may be utilize stationary mounts. Rolling stick holders may include embodiments such that of FIG. 35, which is a side view of a bone-shaped stick holder 2100 containing two collets 150, or of FIG. 36, which is a side view of a bone-shaped stick holder 2200 containing a single collet 150 and a counterbalance roller weight 2244, both in accordance with other embodiments of the present invention. Still further, FIG. 37 is a perspective view of a ball-shaped stick holder 2300 with a collet 150 in accordance with one or more preferred embodiments of the present invention.

Figure 38:
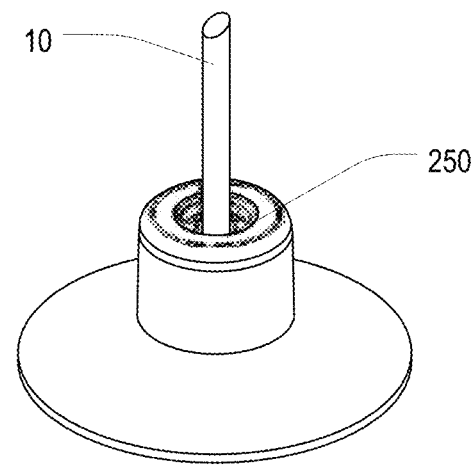
FIG. 38 is a perspective view of a stick holder in accordance with one or more preferred embodiments of the present invention.
Figure 39:
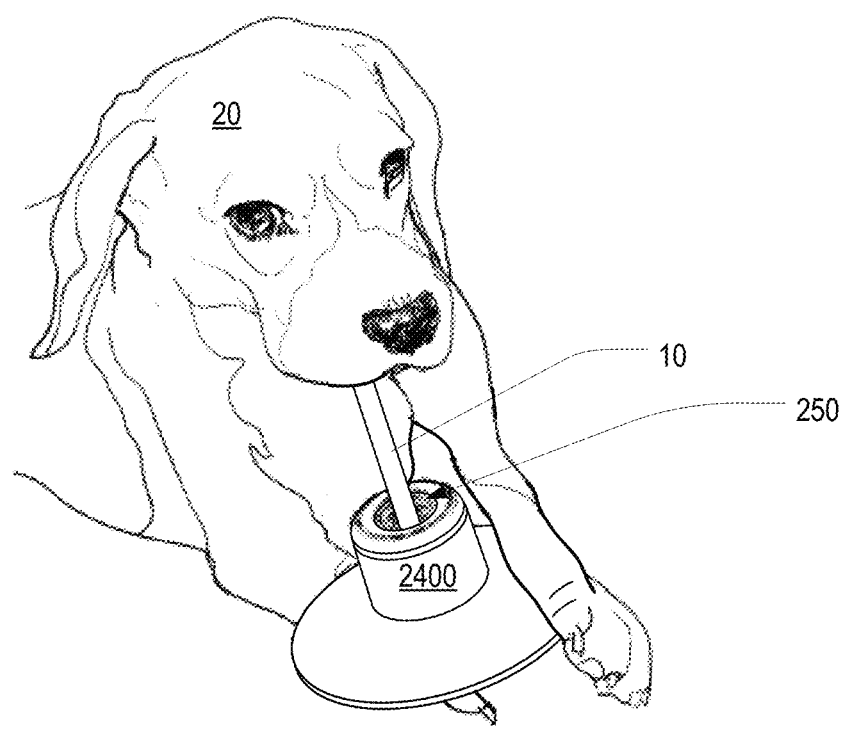
FIG. 39 is an illustration of a dog using the stick holder of FIG. 38.
Figure 40:
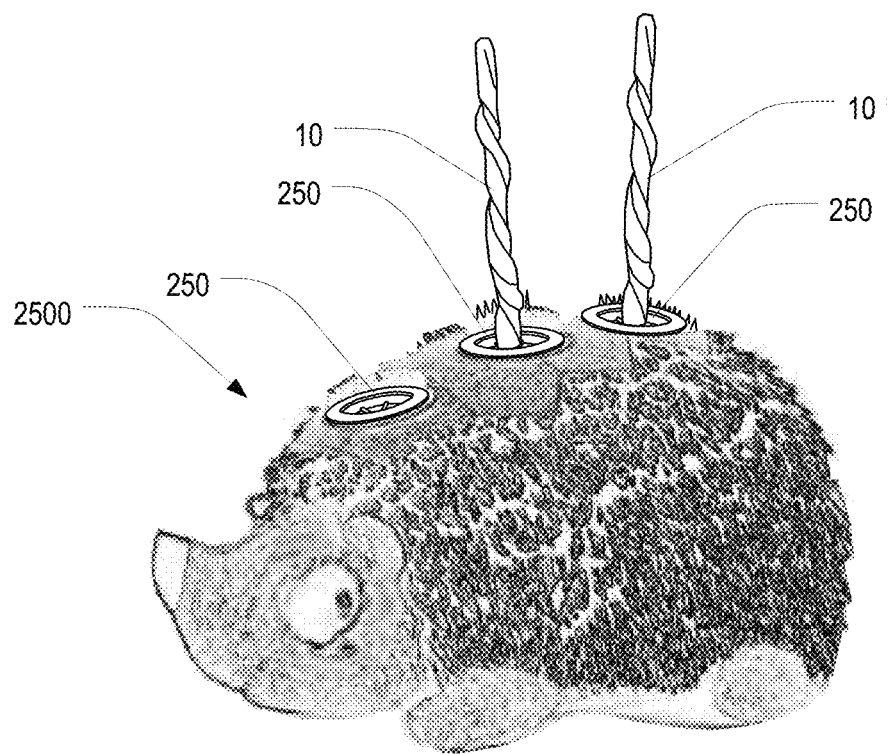
FIG. 40 is a perspective view of a plush toy stick holder with multiple collets in accordance with one or more preferred embodiments of the present invention.

Examples of movable stick holders utilizing collets like those described herein are shown in FIGS. 38 and 40, which are perspective views of stick-holders 2400,2500 with collets 250 like that FIG. 24 in accordance with additional preferred embodiments of the present invention. The stick holder 2400 of FIG. 38 has a flat stable base, allowing the stick holder 2400 to alternatively rest upright on a flat surface or be manipulated by a pet 20 as shown in FIG. 39, while the stick holder of FIG. 40 is a plush toy stick holder 2400 with multiple collets 250 in accordance with one or more preferred embodiments of the present invention. Two of the collets 250 in FIG. 40 are shown holding stick-type objects 10.

Figure 41:
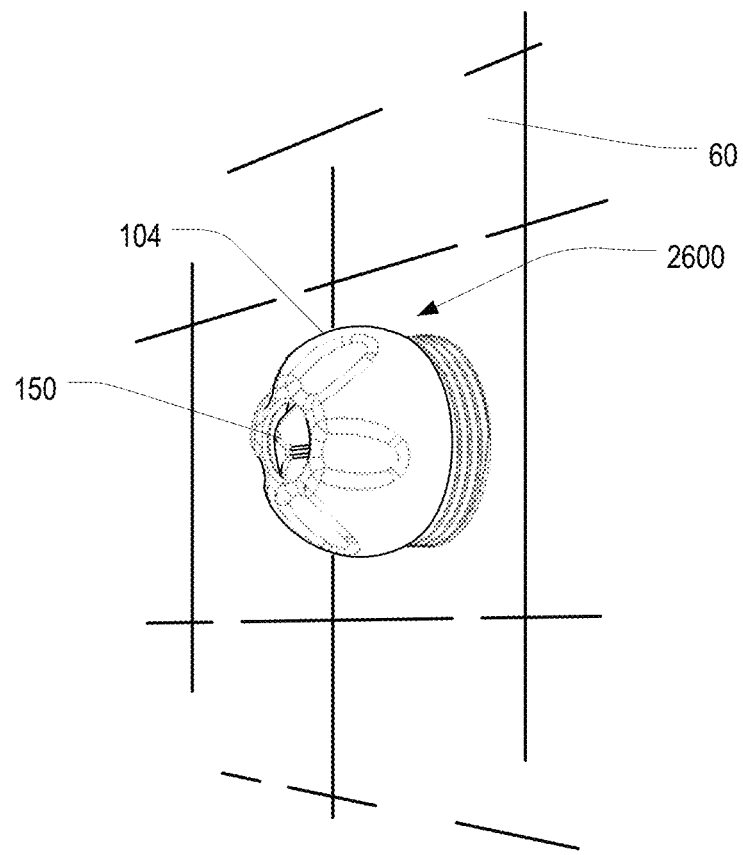
FIG. 41 is a perspective view of a collet-equipped stick holder semi-permanently attached to a surface in accordance with one or more preferred embodiments of the present invention.
Figure 42:
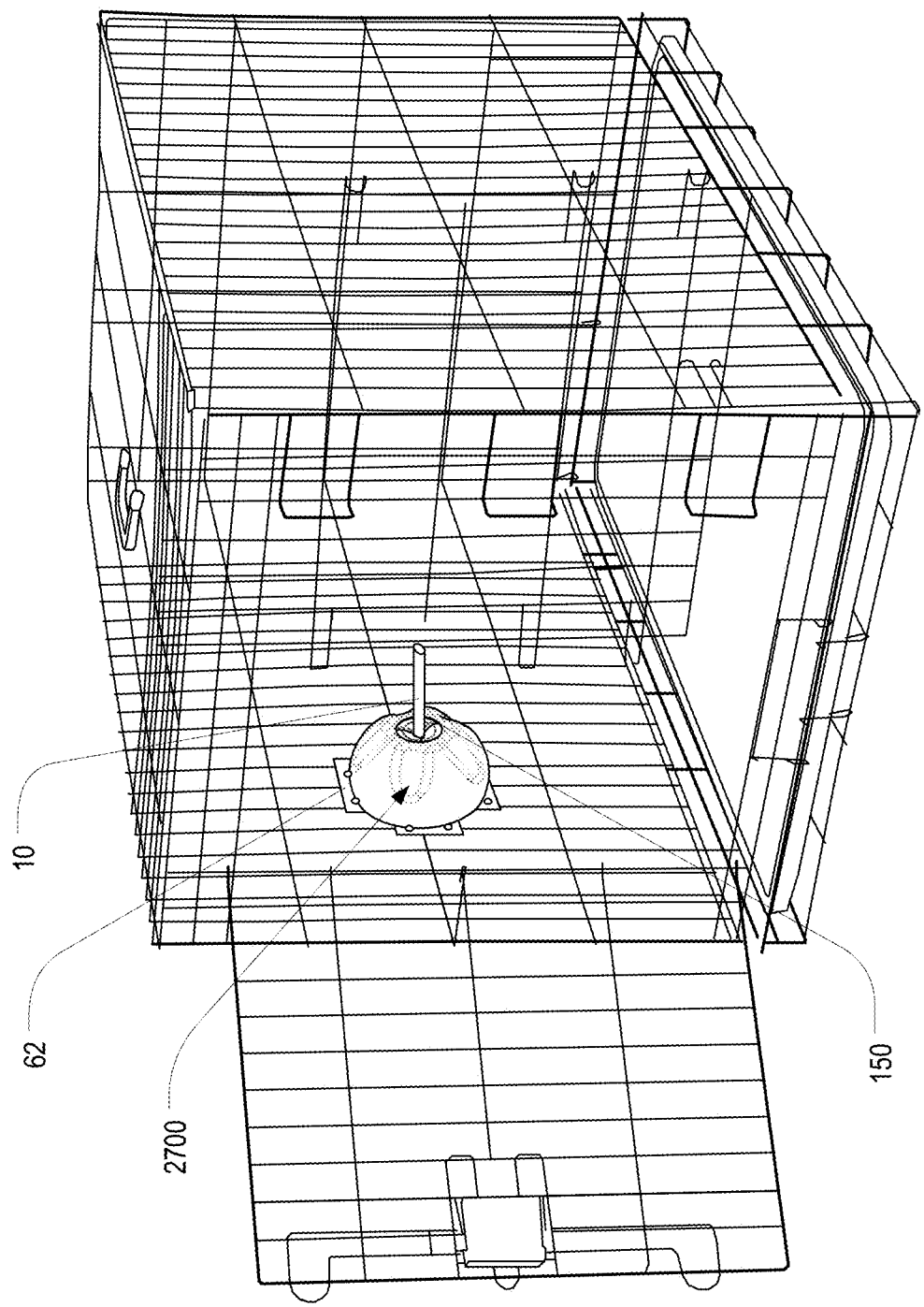
FIG. 42 is perspective view of a collet-equipped stick holder attached to a structure in accordance with one or more preferred embodiments of the present invention.

Examples of stationary stick holders are shown in FIGS. 41 and 42, which are perspective views of collet-equipped stick holders 2500,2600 semi-permanently attached to a flat surface 60 (such as a tiled bathroom wall) or structure 62 (such as a pet kennel or cage) respectively, in accordance with additional preferred embodiments of the present invention. Such stick holders 2500,2600 may be temporarily attached to a surface or structure using suction cups, magnets, removable mounting assemblies, or the like, on the bottom of the holder 2500,2600, or may be permanently attached. In FIGS. 41 and 42, each such holder includes a collet 150 like that of FIG. 2, but holders making use of any of the collets shown or described herein may be utilized instead.

Figure 43:
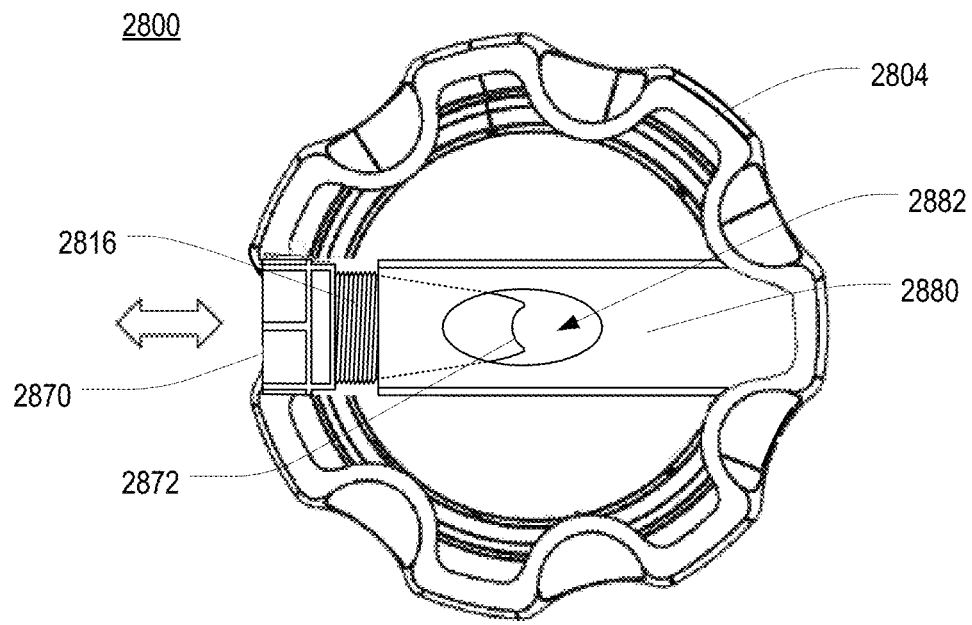
FIG. 43 is a cross-sectional view of a self-righting stick holder with an adjustable jaw in accordance with one or more preferred embodiments of the present invention.

In some cases, alternative retention devices may be utilized to hold a stick-type object 10 in a self-righting stick holder. In this regard, FIG. 43 is a top cross-sectional view of a self-righting stick holder 2800 with an adjustable jaw in accordance with one or more preferred embodiments of the present invention. As shown therein, a shell 2804 supports a spindle 2870 and a retention structure 2880. The spindle 2870 has threads 2816 that screw into corresponding threads in the retention structure 2880, which also has a round or elliptical opening 2882 therein. A distal end of the spindle 2870 includes a concave edge 2872. The stick-type of object 10 may be held in place using edges of the round or elliptical opening 2882 and the concave edge 2872, with the size of the resulting central receptacle being controlled by the extent to which the spindle 2870 is threaded into the retention structure 2880. Although perhaps more limited as to the size of the stick-type object that may be accepted, such an arrangement may be incorporated into a self-righting holder that includes ballast to help the holder sway and wobble but remain upright.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications, or equivalent arrangements; the present invention being limited only by the claims appended hereto and the equivalents thereof.

What is claimed is:

1. A self-righting stick-type object holder for pets, comprising:
   (a) a set of fixed structures, including a top shell and a bottom shell, wherein:
      (i) the top and bottom shells are adjustably coupled to one another and define an interior of the holder,
      (ii) the bottom shell has an exterior having a spherical or semi-spherical profile to facilitate a smooth or relatively-smooth rolling function when the holder is placed upright on a flat surface, and (iii) one or more fixed structures, of the set of fixed structures, include tapered internal surfaces;

(b) ballast disposed in the bottom shell; and (c) a collet disposed in the interior of the holder and having a plurality of collet jaws that have inward-facing contact surfaces, the inward-facing contact surfaces collectively defining a center receptacle, and outward-facing tapered surfaces, the outward-facing tapered surfaces arranged to interact with the tapered internal surfaces of the one or more fixed structures;

(d) wherein the top and bottom shells are adapted to be adjusted, relative to each other, to force the tapered internal surfaces against the outward-facing tapered surfaces of the collet jaws, thereby forcing the collet jaws together and reducing a diameter of the center receptacle such that a stick-type object may be clamped therein; and (e) wherein the ballast and bottom shell are adapted to return the holder to an upright position such that the stick-type object is oriented generally vertically.

2. The self-righting stick-type object holder of claim 1, wherein the top and bottom shells are adjustably coupled to one another via corresponding threads, and wherein the top and bottom shells are adapted to be adjusted, relative to each other, by screwing the top and bottom shells together via the threads.

3. The self-righting stick-type object holder of claim 2, wherein the tapered internal surfaces are located primarily on an interior of the top shell.

4. The self-righting stick-type object holder of claim 3, wherein adjacent jaws, of the plurality of collet jaws, are hinged together at lower portions thereof.

5. The self-righting stick-type object holder of claim 4, wherein the adjacent jaws are hinged together via living hinges.

6. The self-righting stick-type object holder of claim 4, wherein each jaw has a jaw base including a radial side thereof, and wherein the adjacent jaws are hinged together for less than half of a length of the radial side of the jaw base.

7. The self-righting stick-type object holder of claim 3, wherein adjacent jaws, of the plurality of collet jaws, are completely disconnected from one another at lower portions thereof.

8. The self-righting stick-type object holder of claim 2, wherein the jaws are biased to cause the jaws to spread open as the top and bottom shells are adjusted, relative to each other, by unscrewing the top and bottom shells from one another.

9. The self-righting stick-type object holder of claim 2, wherein the set of fixed structures further includes a cinch ring, and wherein the tapered internal surfaces are located primarily on an interior of the cinch ring.

10. The self-righting stick-type object holder of claim 9, wherein the outward-facing tapered surfaces of the collet jaws and the tapered internal surfaces of the cinch ring are substantially conical in shape.

11. The self-righting stick-type object holder of claim 2, wherein the cinch ring is supported by the bottom shell.

12. The self-righting stick-type object holder of claim 2, wherein the ballast includes a solid weight.

13. The self-righting stick-type object holder of claim 2, further comprising a ballast cap that secures the ballast in place in the bottom shell.

14. The self-righting stick-type object holder of claim 13, wherein the ballast is a granular material.

15. The self-righting stick-type object holder of claim 13, wherein the ballast is a liquid.

16. The self-righting stick-type object holder of claim 13, wherein the collet is supported by the ballast cap.

17. The self-righting stick-type object holder of claim 2, wherein the inward-facing contact surfaces each include a plurality of teeth.

18. The self-righting stick-type object holder of claim 2, wherein each collet jaw further includes an inward-facing undercut portion, beneath the inward-facing contact surface, adapted to receive a stop block on a lower end of the stick-type object such that the inward-facing contact surfaces clamp the stick-type object just above the stop block.

19. The self-righting stick-type object holder of claim 18, wherein the inward-facing undercut portion has the shape of an angled portion of a cone.

20. The self-righting stick-type object holder of claim 19, wherein a stick-type object is clamped between the jaws, wherein the stop block is generally conical with a first conical angle relative to an axis of the stick-type object, wherein the angled portion of the cone has a second conical angle relative to the axis of the stick-type object, and the first and second angles are generally similar.

\* \* \* \* \*